US009342943B2

(12) United States Patent
Chugo

(10) Patent No.: US 9,342,943 B2
(45) Date of Patent: May 17, 2016

(54) BANKNOTE PROCESSING DEVICE, AND BANKNOTE PROCESSING METHOD

(71) Applicant: Oki Electric Industry Co., Ltd., Tokyo (JP)

(72) Inventor: Akihiro Chugo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/417,134

(22) PCT Filed: Jun. 20, 2013

(86) PCT No.: PCT/JP2013/066999
§ 371 (c)(1),
(2) Date: Jan. 23, 2015

(87) PCT Pub. No.: WO2014/034234
PCT Pub. Date: Mar. 6, 2014

(65) Prior Publication Data

US 2015/0213667 A1 Jul. 30, 2015

(30) Foreign Application Priority Data

Sep. 3, 2012 (JP) ................................ 2012-193392

(51) Int. Cl.
*G06Q 40/00* (2012.01)
*G07D 11/00* (2006.01)

(52) U.S. Cl.
CPC ........ *G07D 11/0084* (2013.01); *G07D 11/0018* (2013.01); *G07D 11/0051* (2013.01); *G07D 11/0054* (2013.01); *G07D 11/0057* (2013.01); *G07D 11/0066* (2013.01); *G07D 11/0081* (2013.01)

(58) Field of Classification Search
USPC ............................ 235/379, 380, 383; 705/43
See application file for complete search history.

(56) References Cited

U.S. PATENT DOCUMENTS

| | | | | |
|---|---|---|---|---|
| 5,719,383 | A * | 2/1998 | Forrest | G07F 9/02 165/80.3 |
| 6,065,672 | A * | 5/2000 | Haycock | G07D 11/0009 235/379 |
| 6,454,163 | B2 * | 9/2002 | Peebles | G07D 11/0018 235/379 |
| 6,581,746 | B1 * | 6/2003 | Lundblad | B65H 29/006 194/206 |
| 7,694,877 | B2 * | 4/2010 | Hemming | G07D 11/0081 235/379 |
| 2007/0219927 | A1 * | 9/2007 | Woeffen | G06Q 20/401 705/75 |
| 2011/0004337 | A1 | 1/2011 | Doi | |

FOREIGN PATENT DOCUMENTS

| | | | |
|---|---|---|---|
| JP | 2000-011231 | A | 1/2000 |
| JP | 2001-093022 | A | 4/2001 |
| WO | WO-2009/107165 | A1 | 9/2009 |

* cited by examiner

*Primary Examiner* — Ahshik Kim
(74) *Attorney, Agent, or Firm* — Rabin & Berdo, P.C.

(57) ABSTRACT

The present invention provides a banknote processing device that, even when banknotes are being processed based on commands from plural users, the banknotes that each user is responsible for handling may be easily identified. Namely, banknote processing device according to the present invention is connected with plural operation devices respectively operated by plural users and processes banknotes based on commands from the users inputted via the operation devices. The banknote processing device includes a conveyance section that conveys the banknotes and plural banknote storage sections that store the banknotes conveyed by the conveyance section. The plural banknote storage sections include: a first dedicated storage section that stores only banknotes processed based on commands from a first user among the plural users; and a second dedicated storage section that stores only banknotes processed based on commands from a second user among the plural users.

10 Claims, 27 Drawing Sheets

FIG.6

T1

| USER ID | TRANSACTION PROCESS |
|---|---|
| T001 | DEPOSIT (1) |
| T001 | DEPOSIT (2) |
| T002 | WITHDRAWAL (1) |
| T001 | WITHDRAWAL (2) |
| T002 | DEPOSIT (3) |

FIG.7

T2

| STACKING POSITION INFORMATION | BANKNOTE INFORMATION | | |
|---|---|---|---|
| | DENOMINATION | SERIAL NUMBER | TRANSACTION PROCESS |
| 1 | 20 YUAN | 0001 | DEPOSIT (1) |
| 2 | 50 YUAN | 0002 | DEPOSIT (1) |
| 3 | 100 YUAN | 0003 | WITHDRAWAL (1) |
| 4 | 50 YUAN | 0004 | WITHDRAWAL (2) |
| 5 | 50 YUAN | 0005 | WITHDRAWAL (2) |
| ... | ... | ... | ... |
| N | 50 YUAN | 0006 | DEPOSIT (3) |

FIG.8

S

| STACKING POSITION INFORMATION | BANKNOTE INFORMATION | | | |
|---|---|---|---|---|
| | DENOMINATION | SERIAL NUMBER | TRANSACTION PROCESS | USER ID |
| 1 | 20 YUAN | 0001 | DEPOSIT (1) | T001 |
| 2 | 50 YUAN | 0002 | DEPOSIT (1) | T001 |
| 3 | 100 YUAN | 0003 | WITHDRAWAL (1) | T002 |
| 4 | 50 YUAN | 0004 | WITHDRAWAL (2) | T001 |
| 5 | 50 YUAN | 0005 | WITHDRAWAL (2) | T001 |
| ... | ... | ... | ... | ... |
| N | 50 YUAN | 0006 | DEPOSIT (3) | T002 |

BANKNOTE PROCESSING DEVICE, AND BANKNOTE PROCESSING METHOD

TECHNICAL FIELD

The present invention relates to a banknote processing device and a banknote processing method.

BACKGROUND ART

Cash processing devices, typified by service counter cash processors, are installed at the counters of service branches of financial institutions and the like. These cash processing devices are used for banknote and coin deposit transactions, withdrawal transactions, and the like. A staff member who is an operator of a cash processing device may, for example, carry out deposit transactions, withdrawal transactions and the like by performing operations from an operation unit of the cash processing device or from a service terminal connected to the cash processing device.

In the below-described Japanese Patent Application Laid-Open (JP-A) No. 2001-93022, a cash processing device is disclosed that carries out deposit processes and withdrawal processes. A deposit process temporarily holds banknotes inserted in a banknote insertion aperture at a temporary holding section, and then stores the banknotes in a stacker. A deposit process separates banknotes stored in the stacker and conveys the banknotes to a banknote withdrawal aperture.

SUMMARY OF INVENTION

Technical Problem

However, among cash processing devices, there is a cash processing device that is connected with plural operation devices respectively operated by plural staff members, and that carries out deposit processes, withdrawal processes and the like, in accordance with commands from the staff members inputted via the operation devices. In this situation, banknotes being deposited and withdrawn in accordance with commands from the staff members are mixed together, and it is difficult for a staff member to judge, for example, which of the banknotes in the cash processing device that staff member is responsible for handling.

The present invention provides a new and improved banknote processing device at which, even when banknotes are being processed in accordance with commands from plural users, the banknotes that each user is responsible for handling may be easily identified.

Solution to Problem

A first aspect of the invention is a banknote processing device, connected to plural operation devices respectively operated by plural users, that processes banknotes in accordance with commands from the users via the operation devices, the banknote processing device including: a conveyance section that conveys the banknotes; and plural banknote storage sections that store the banknotes conveyed by the conveyance section, wherein the plural banknote storage sections include, a first dedicated storage section that stores only banknotes processed in accordance with commands from a first user among the plural users, and a second dedicated storage section that stores only banknotes processed in accordance with commands from a second user among the plural users.

According to the first aspect of the present invention, the plural banknote storage sections that store banknotes include the first dedicated storage section, which stores only banknotes being processed in accordance with commands from, of the plural users, the first user, and the second dedicated storage section, which stores only banknotes being processed in accordance with commands from, of the plural users, the second user. Thus, the first aspect of the present invention may prevent banknotes that are being deposited and withdrawn in accordance with commands from the first user from being mixed together with banknotes that are being deposited and withdrawn in accordance with commands from the second user. Therefore, in the first aspect of the present invention, even when banknotes are being processed in accordance with commands from plural users, the banknotes that each user is responsible for handling may be easily identified.

In a second aspect of the present invention, in the above first aspect, the plural banknote storage sections may include a common storage section that stores banknotes processed in accordance with commands from the first user and banknotes used in accordance with commands from the second user.

In a third aspect of the present invention, in the above aspects, the first dedicated storage section and the second dedicated storage section may store banknotes of the same denomination.

In a fourth aspect of the present invention, in the above aspects, the plural banknote storage sections may include the first dedicated storage section and the second dedicated storage section classified by denominations of the banknotes.

In a fifth aspect of the present invention, in the above second aspect, the first dedicated storage section and the second dedicated storage section may stack the banknotes during banknote deposit processing and feed out the banknotes during banknote withdrawal processing, and the common storage section may include a storage section that stacks banknotes during the deposit processing but does not feed out banknotes during the withdrawal processing.

In a sixth aspect of the present invention, in the above aspects, the first dedicated storage section and the second dedicated storage section may each include a deposit-only storage section that stacks banknotes during banknote deposit processing but does not feed out banknotes during banknote withdrawal processing.

In a seventh aspect of the present invention, in the above sixth aspect, the plurality of banknote storage sections may include a common storage section that stores banknotes processed in accordance with commands from the first user and banknotes used in accordance with commands from the second user, and the common storage section may include a feed-only storage section that does not stack banknotes during the deposit processing but does feed out banknotes during the withdrawal processing.

In an eighth aspect of the present invention, in the above first aspect, the plural banknote storage sections may be constituted only by plural first dedicated storage sections and second dedicated storage sections.

In a ninth aspect of the present invention, in the above second aspect, may further include: a withdrawal aperture at which the banknotes are fed out; and a control section that controls conveyance of the banknotes, wherein, during a recovery process of banknotes from the common storage section to the withdrawal aperture, the control section conveys to the withdrawal aperture, of the banknotes stored in the common storage section, only banknotes processed in accordance with commands from one of the first user or the second user.

In a tenth aspect of the present invention, in the above second aspect, may further include a memory section that memorizes information representing whether a banknote stored in the common storage section has been processed in accordance with a command from the first user or the second user.

Advantageous Effects of Invention

According to the above-described aspects of the present invention, even when banknotes are being processed in accordance with commands from plural users, the banknotes that each user is responsible for handling may be easily identified.

BRIEF DESCRIPTION OF DRAWINGS

FIG. 6 is a diagram for describing an example of correspondences between user IDs and process information.

FIG. 7 is a diagram for describing an example of banknote information relating to banknotes in a common cassette.

FIG. 8 is a diagram for describing an example of a display screen showing correspondences between user IDs and banknote information of banknotes in the common cassette.

DESCRIPTION OF EMBODIMENTS

Herebelow, preferable embodiments of the present invention are described in detail while referring to the attached drawings. In the present specification and drawings, structural elements with substantially the same functional structures are assigned the same reference symbols, and duplicative descriptions thereof are omitted accordingly.

1. First Exemplary Embodiment

1-1. Example of Internal Structure of Banknote Processing Device

Figure 1:
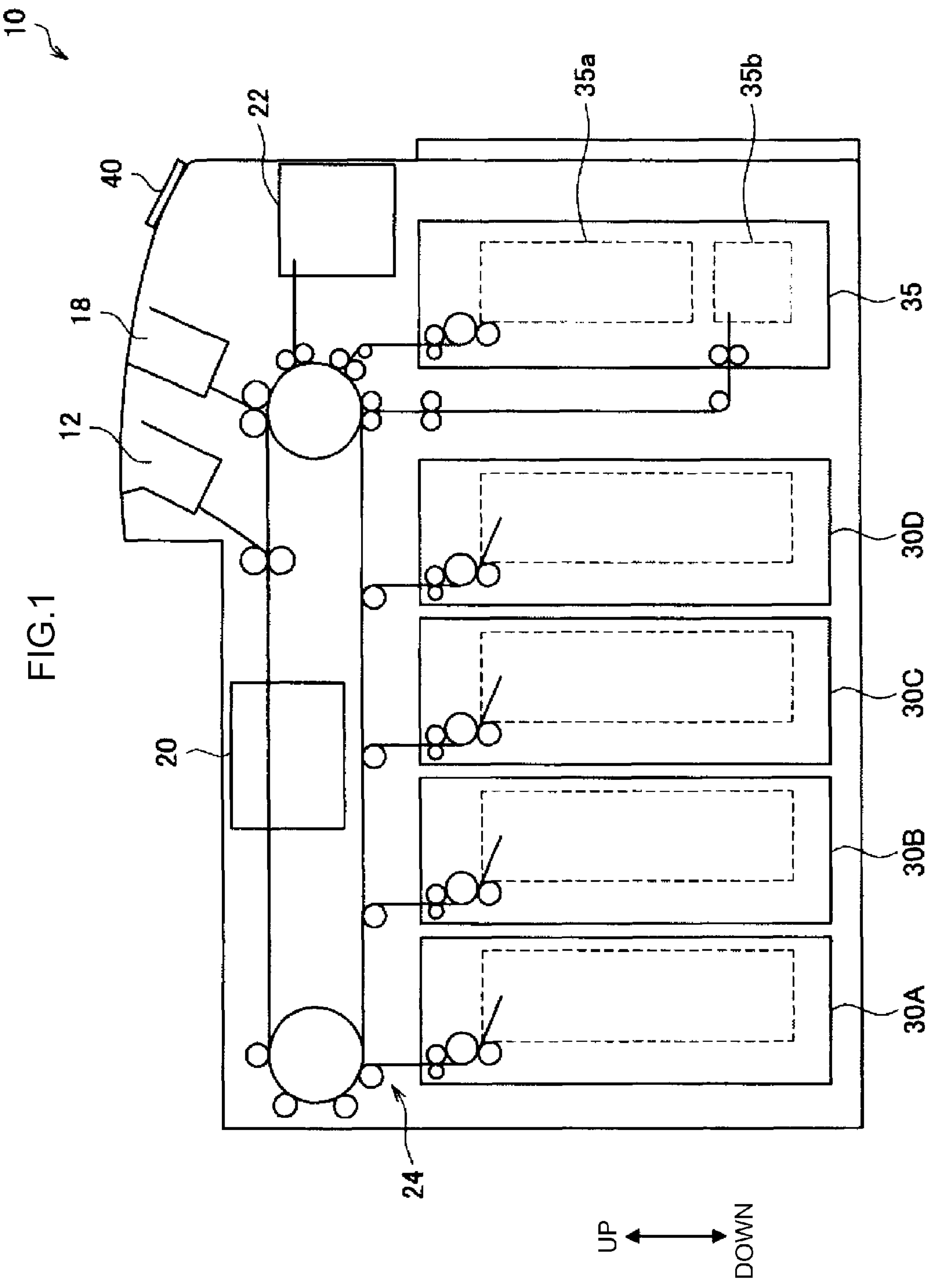
FIG. 1 is a diagram showing an example of internal structure of a banknote processing device 10 according to a first exemplary embodiment.

An example of the internal structure of a banknote processing device 10 in accordance with a first exemplary embodiment is described referring to FIG. 1.

FIG. 1 is a diagram showing an example of internal structure of the banknote processing device 10 in accordance with the first exemplary embodiment. The banknote processing device 10 is installed in a service branch of a financial institution or the like. The banknote processing device 10 is a staff-operated terminal that executes banknote transactions in accordance with operations by staff members who are operators of the device, such as front counter staff of the financial institution and the like.

As shown in FIG. 1, the banknote processing device 10 includes a deposit aperture 12, a withdrawal aperture 18, a banknote verification section 20, a temporary holding section 22, a conveyance section 24, banknote cassettes 30A, 30B, 30C and 30D, a banknote cassette with a reject container 35 and a display unit 40. The banknote cassettes 30A to 30D and the banknote cassette with a reject container 35 correspond to an example of plural banknote storage sections that store banknotes.

The deposit aperture 12 is an insertion aperture at which a staff member inserts banknotes. The deposit aperture 12 may be provided with a shutter (not shown in the drawings) that opens and closes an opening portion. The deposit aperture 12 has a separation function that separates banknotes inserted in a bundle and feeds the banknotes one by one.

The withdrawal aperture 18 is an ejection aperture at which banknotes to be collected by a staff member are ejected (withdrawn). The withdrawal aperture 18 has a stacking function that stacks the banknotes being ejected. The withdrawal aperture 18 may be provided with a shutter (not shown in the drawings) that opens and closes an opening portion. The withdrawal aperture 18 has a volume in which, for example, 100 banknotes (a maximum stacking number) may be stacked. In the example shown in FIG. 1, a single withdrawal aperture is provided. However, this is not limiting and there may be, for example, two or more withdrawal apertures.

The banknote verification section 20 verifies banknotes passing therethrough one by one. The banknote verification section 20 can deal with banknotes progressing in both directions: it may verify banknotes being conveyed in the direction from the deposit aperture 12 and banknotes being conveyed in the opposite direction. To be specific, the banknote verification section 20 identifies the denomination of a banknote being conveyed along the conveyance path, whether the banknote is authentic or not (genuine or counterfeit), whether the banknote is intact or damaged (fit or unfit), a traveling state of the banknote (proper or improper), and the like. Thus, the banknote verification section 20 determines whether a banknote passing through is proper or a reject.

In the present specification, a genuine note is authenticated as being a banknote but a counterfeit note is not authenticated as being a banknote. Banknotes that are authenticated as being genuine and intact are verified as being suitable for deposits and withdrawals but, among banknotes that are authenticated as being genuine, damaged notes are verified as being unsuitable for deposits and withdrawals. A reject determination can be based on factors such as inauthenticity, damage (staining, tearing, improper shape or the like), and traveling problems (a skewed banknote, double-feeding or the like). Reject banknotes may also include banknotes that cannot be used as withdrawal banknotes (for example, 2,000 yen notes and 5,000 yen notes) and may include foreign banknotes.

The temporary holding section 22 has functions of both separation and stacking of banknotes. For example, during a deposit transaction, the temporary holding section 22 temporarily stacks banknotes that have been separated from the deposit aperture 12 and verified as proper by the banknote verification section 20. When the transaction is completed, such as when an account total of the deposited banknotes or the like is confirmed or the like, the banknotes stacked in the temporary holding section 22 are fed out and are conveyed through the banknote verification section 20 to the banknote cassettes 30A to 30D or the like. The temporary holding section 22 may be of a stacking type in which banknotes are successively superposed and stacked, or may be of a drum type in which banknotes are successively wound on to be stored.

The conveyance section 24 includes conveyance paths, conveyance rollers that convey the banknotes, and driving mechanisms that drive the conveyance rollers. The conveyance section 24 conveys the banknotes one by one. A driving mechanism drives a conveyance roller by, for example, rotation of a DC servo motor or a pulse motor or the like. The conveyance section 24 is controlled by a control section, which is described below, and conveys the banknotes to target conveyance destinations.

The banknote cassettes 30A to 30D are banknote storage sections in which banknotes can be stored in respective denominations, and have functions of both stacking and separating banknotes. The banknote cassettes 30A to 30D may include a plural number of cassettes that store the same denomination. For example, the banknote cassettes 30A and 30C may be banknote cassettes for 10,000 yen notes and the banknote cassettes 30B and 30D may be banknote cassettes for 1,000 yen notes. The banknote cassettes 30A to 30D may be structures that can be mounted at and removed from the banknote processing device 10, and banknotes may be loaded in the banknote cassettes 30A to 30D by the banknote cassettes 30A to 30D being replaced as units.

The banknote cassette with a reject container 35 (hereinafter referred to as a banknote cassette 35) is a structure that can be mounted at and removed from the banknote processing device 10, and banknotes may be recovered and re-stocked by the banknote cassette 35 being replaced as a unit. The banknote cassette 35 is equipped with a banknote storage container 35*a* at the upper side thereof and a reject container 35*b* at the lower side (a floor portion) thereof.

The banknote storage container 35*a* has the stacking function that stacks banknotes and the separation function that feeds out banknotes one by one. The banknote storage container 35*a* stacks banknotes separated from the banknote cassettes 30A to 30D at a time of cassette counting and recovery, and may recover these banknotes. For cassette counting and re-stocking, the banknote storage container 35*a* may feed banknotes stored in the banknote storage container 35*a* and re-stock the banknotes in the banknote cassettes 30A to 30D.

The reject container 35*b* has only the stacking function that stacks banknotes. The reject container 35*b* is a banknote storage section for stacking banknotes (reject banknotes) identified as improper by the banknote verification section 20 (reject determination).

The display unit 40 displays menu screens, processing result screens and the like. The display unit 40 is implemented with, for example, a cathode ray tube (CRT) display device, a liquid crystal display (LCD) device or an organic light-emitting diode (OLED) device.

The banknote processing device 10 further includes an operation section 42 (see FIG. 2) that is operable by staff members. The banknote processing device 10 carries out deposit processes, withdrawal processes and the like corresponding to deposit and withdrawal transactions and the like in accordance with operations of the operation section 42 by staff members who are operators of the device. The banknote processing device 10 may carry out processes on the basis of operations by staff members at, instead of the operation section 42, a plural number of service terminals 90*a* and 90*b* that are connected to the banknote processing device 10 as shown in FIG. 2.

Figure 2:
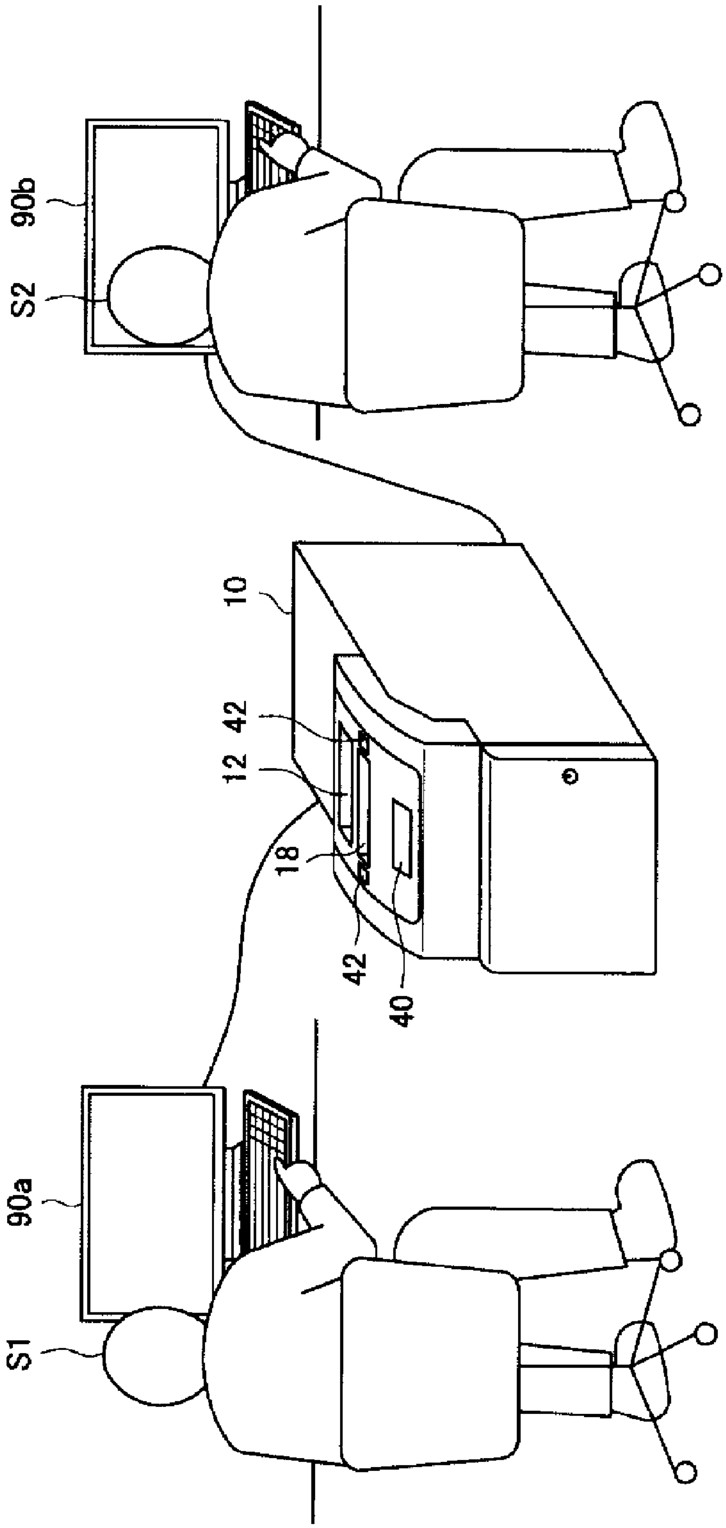
FIG. 2 is a diagram showing a structural example of a plural number of service terminals 90*a* and 90*b* that are connected to the banknote processing device 10.

FIG. 2 is a diagram showing a structural example of the plural service terminals 90*a* and 90*b* connected to the banknote processing device 10, which are an example of operation devices. In FIG. 2, the two service terminals 90*a* and 90*b* are connected to the banknote processing device 10 by wire (cables), and the banknote processing device 10 is disposed between the service terminal 90*a* and the service terminal 90*b*. The service terminal 90*a* is operated by a staff member S1, and the service terminal 90*b* is operated by a staff member S2. The service terminals 90*a* and 90*b* send commands such that processing modes selected by the staff members S1 and S2 (deposit and withdrawal transactions and the like) are executed by the banknote processing device 10. Thus, the single banknote processing device 10 is shared by the plural service terminals 90*a* and 90*b*.

Although the two service terminals 90*a* and 90*b* are connected to the banknote processing device 10 in FIG. 2, this is not limiting and three or more service terminals may be connected to the banknote processing device 10. Moreover, although the service terminals 90*a* and 90*b* are connected to the banknote processing device 10 by wire in the above description, this is not limiting and service terminals may be connected by wireless (through a LAN or the like).

1-2. Basic Processes of the Banknote Processing Device

As basic processes, the banknote processing device 10 carries out, for example, deposit processes, withdrawal processes, re-stocking processes and recovery processes. Herebelow, each process is described while referring to FIG. 1.

—Deposit Processing—

A deposit process is a process that stacks banknotes from the deposit aperture 12 inside the banknote processing device 10. As deposit processes, the banknote processing device 10 carries out, for example, ordinary deposit processes, in which deposited banknotes are withdrawn to the temporary holding section 22 and then stacked from the temporary holding section 22 into the banknote cassettes 30A to 30D, and direct deposit processes, in which deposited banknotes are directly stacked in the banknote cassettes 30A to 30D without being withdrawn to the temporary holding section 22. The banknote processing device 10 may select an ordinary deposit process or a direct deposit process in accordance with settings.

First, an ordinary deposit process is described. In the ordinary deposit process, firstly, banknotes inserted at the deposit aperture 12 are separated and fed one by one, and the fed banknotes are conveyed by the conveyance section 24 to the banknote verification section 20. The banknote verification section 20 verifies the banknotes, and banknotes for which the results of verification are that the banknotes are proper are conveyed to and stacked in the temporary holding section 22. Subsequently, when a deposit amount is confirmed, the banknote processing device 10 advances to stacking processing.

On the other hand, a banknote for which the result of verification by the banknote verification section 20 is that the banknote is improper (a reject banknote) is stacked in the withdrawal aperture 18. Banknotes stacked in the withdrawal aperture 18 may be re-inserted at the deposit aperture 12 by a staff member and re-verified by the banknote verification section 20. Hereinafter, processing in which banknotes are verified by the banknote verification section 20 and the banknotes are conveyed to conveyance destinations in accordance with the verification results is referred to as counting processing.

In the stacking processing, the banknotes are separated one by one from the temporary holding section 22, and each separated banknote is conveyed to the banknote verification section 20. Then, a banknote for which the result of verification by the banknote verification section 20 is that the banknote is proper is stacked in the banknote cassettes 30A to 30D in accordance with the denomination thereof. On the other hand, a banknote for which the result of verification by the banknote verification section 20 is that the banknote is improper (a reject banknote), such as a damaged note, a folded note, or a banknote whose traveling state is skewed or the like, is stacked in the reject container 35*b* of the banknote cassette 35.

Alternatively, if a return of the deposited banknotes (a cancellation) is instructed before a deposit amount is confirmed, the banknote processing device 10 switches to return processing. In the return processing, the banknotes are separated one by one from the temporary holding section 22, and the separated banknotes are conveyed to the banknote verification section 20. Regardless of whether the results of verification by the banknote verification section 20 are that the banknotes are proper or improper, all of the banknotes are stacked at the withdrawal aperture 18.

Now, a direct deposit process is described. The same as in the ordinary deposit process, banknotes that are inserted at the deposit aperture 12 are verified by the banknote verification section 20. Then, banknotes for which the results of verification are that the banknotes are proper are stacked in the banknote cassettes 30A to 30D in accordance with the denominations thereof. On the other hand, a banknote for which the result of verification is that the banknote is improper (a reject banknote) is stacked in the withdrawal aperture 18. Banknotes stacked in the withdrawal aperture 18 may be re-inserted at the deposit aperture 12 by a staff member and re-verified by the banknote verification section 20.

—Withdrawal Processing—

A withdrawal process is a process that stacks banknotes from the banknote cassettes 30A to 30D in the withdrawal aperture 18.

In the withdrawal process, banknotes are separated and fed out one by one from the banknote cassettes 30A to 30D in accordance with a specified amount, and the fed banknotes are conveyed to the banknote verification section 20 by the conveyance section 24. Then, the banknote verification section 20 verifies the banknotes, and a banknote for which the result of verification is that the banknote is proper is stacked at the withdrawal aperture 18. Specifically, the banknotes are stacked (collected) in the withdrawal aperture 18 in accordance with, for example, denominations and numbers of proper banknotes to be withdrawn. On the other hand, a banknote for which the result of verification is that the banknote is improper, which is to say a banknote that may not be paid to the customer, is stacked in the reject container 35*b* of the banknote cassette 35.

—Re-Stocking Processing—

The re-stocking process is a process for re-stocking banknotes in the banknote processing device 10. In the banknote processing device 10, deposit aperture re-stocking, cassette replacement re-stocking and cassette counting re-stocking are available as specific re-stocking methods. These re-stocking methods are described herebelow.

Deposit aperture re-stocking is similar to the operations of the above-described deposit processing. For example, a banknote fed from the deposit aperture 12 for which the result of verification by the banknote verification section 20 is that the banknote is proper is temporarily withdrawn to the temporary holding section 22, and subsequently stacked in the banknote cassette 30A to 30D corresponding to the denomination thereof. On the other hand, a banknote for which the result of verification is that the banknote is improper is stacked in the withdrawal aperture 18.

In the cassette replacement re-stocking, the fact that the banknote cassettes 30A to 30D are removable is utilized, and banknotes are re-stocked by one of the banknote cassettes 30A to 30D being replaced with a banknote cassette that has previously been loaded with banknotes. In cassette replacement re-stocking, the denominations and numbers of re-stocked banknotes must be manually registered by an operator.

In cassette counting re-stocking, banknotes are pre-loaded into the banknote storage container 35*a* of the banknote cassette 35, and the banknote cassette 35 is installed in the banknote processing device 10. Then, banknotes fed out from the banknote storage container 35*a* for which the results of verification by the banknote verification section 20 are that the banknotes are proper are stacked in the banknote cassettes 30A to 30D in accordance with the denominations thereof. On the other hand, a banknote for which the result of verification is that the banknote is improper is stacked in the reject container 35*b*. Thus, in cassette counting re-stocking, a counting process is implemented by the banknote verification section 20, and an operator does not have to manually register the denominations and numbers of the re-stocked banknotes.

—Recovery Processing—

The recovery process is a process for recovering banknotes from inside the banknote processing device 10. In the banknote processing device 10, withdrawal aperture recovery, cassette replacement recovery and cassette counting recovery are available as specific recovery methods. These recovery methods are described herebelow.

Withdrawal aperture recovery is similar to the operations of the above-described withdrawal transaction. For example, a banknote fed out from a recovery target among the banknote cassettes 30A to 30D for which the result of verification by the banknote verification section 20 is that the banknote is proper is stacked at the withdrawal aperture 18. On the other hand, a banknote for which the result of verification is that the banknote is improper is stacked in the reject container 35*b*. This process may be applied to all banknotes stacked in the recovery target banknote cassette 30A to 30D, and a staff member may recover the banknotes that are determined to be proper from the withdrawal aperture 18. The staff member may also recover the banknotes that are determined to be improper from the reject container 35*b*.

In cassette replacement recovery, banknotes are recovered by removing a predetermined banknote cassette among the banknote cassettes 30A to 30D from the banknote processing device 10. In cassette replacement recovery, an operator takes banknotes out from the banknote cassette 30A to 30D that has been removed, and has to manually count the denominations and numbers of the recovered banknotes.

In cassette counting recovery, a banknote fed from a recovery target banknote cassette among the banknote cassettes 30A to 30D for which the result of verification by the banknote verification section 20 is that the banknote is proper is stacked in the banknote storage container 35*a* of the banknote cassette 35. On the other hand, a banknote for which the result of verification is that the banknote is improper is stacked in the reject container 35*b*. Subsequently, the banknotes determined to be proper and the banknotes determined to be improper may be recovered by a staff member removing only the banknote cassette 35 from the banknote processing device 10. Thus, in cassette counting recovery, a counting process is implemented by the banknote verification section 20, and the operator does not have to manually count the denominations and numbers of the recovered banknotes.

1-3. Example of Application of the Banknote Cassettes

The banknote processing device 10 is connected to the plural service terminals 90*a* and 90*b* that are respectively operated by the aforementioned plural staff members S1 and S2. Accordingly, the banknote processing device 10 carries out processes on banknotes, such as deposit processes, withdrawal processes and the like, in accordance with commands from the staff members inputted via the service terminals 90*a* and 90*b*. In other words, the plural service terminals 90*a* and 90*b* share the single banknote processing device 10.

In the banknote processing device 10 described above, there is a risk that banknotes being deposited and withdrawn in accordance with commands from the staff members may be mixed together. For example, banknotes being deposited in accordance with a command from the staff member S1 via the service terminal 90*a* may be withdrawn by a command from the staff member S2 via the service terminal 90*b*. In this situation, it is difficult to judge which of the banknotes in the banknote processing device 10 each staff member is responsible for handling.

Figure 3:
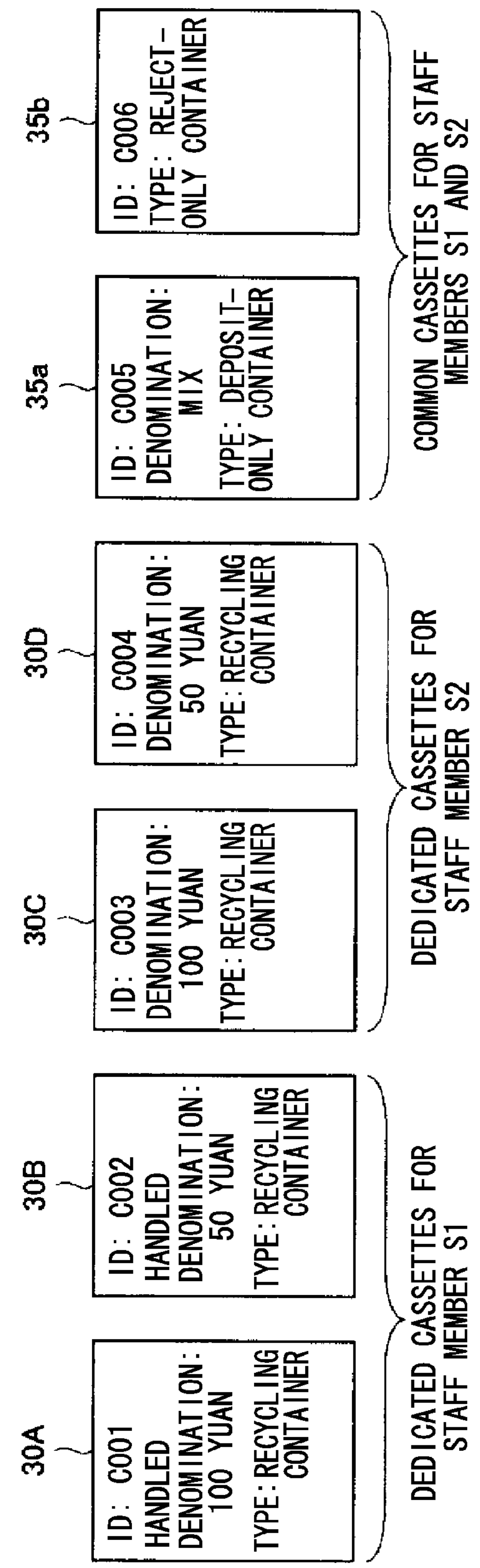
FIG. 3 is a schematic diagram for describing an example of application of banknote cassettes according to the first exemplary embodiment.

Accordingly, in the banknote processing device 10 according to the first exemplary embodiment, in order for banknotes that the respective users are responsible for handling to be easily identified even when banknote deposit processes, withdrawal processes and the like are being carried out in accordance with commands from the plural staff members, as shown in FIG. 3, the provision of dedicated banknote cassettes that store only banknotes being processed in accordance with commands from the individual staff members S1 and S2 is applied.

FIG. 3 is a schematic diagram for describing an example of application of banknote cassettes in accordance with the first exemplary embodiment. As shown in FIG. 3, the banknote cassette 30A and the banknote cassette 30B are dedicated cassettes (corresponding to a "first dedicated storage section") that store only banknotes being processed in accordance with commands from, of the staff members S1 and S2, staff member S1. The banknote cassette 30C and the banknote cassette 30D are dedicated cassettes (corresponding to a "second dedicated storage section") that store only banknotes being processed in accordance with commands from, of the staff members S1 and S2, staff member S2. The banknote storage container 35*a* and the reject container 35*b* are common cassettes (corresponding to a "common storage section") that store both banknotes being processed in accordance with commands from staff member S1 and banknotes being processed in accordance with commands from staff member S2.

The banknote cassettes 30A to 30D store banknotes separated by denomination. The banknote cassette 30A and the banknote cassette 30C store the same denomination, which is a first denomination (hereinafter taken to be, as an example, 100 Yuan), and the banknote cassette 30B and the banknote cassette 30D store the same denomination, which is a second denomination (hereinafter taken to be, as an example, 50 Yuan). In the first exemplary embodiment, the banknote cassettes 30A to 30D are recycling containers that stack banknotes during banknote deposit processing and that feed out banknotes during banknote withdrawal processing.

In the first exemplary embodiment, the banknote storage container 35*a* is a deposit-only container that stacks banknotes during banknote deposit processing but does not feed out banknotes during banknote withdrawal processing. As described above, the reject container 35*b* has the function of stacking banknotes (reject banknotes) verified as being improper by the banknote verification section 20 (reject determination).

—Examples of Conveyance of Banknotes During Deposit Processing—

Figure 4A:
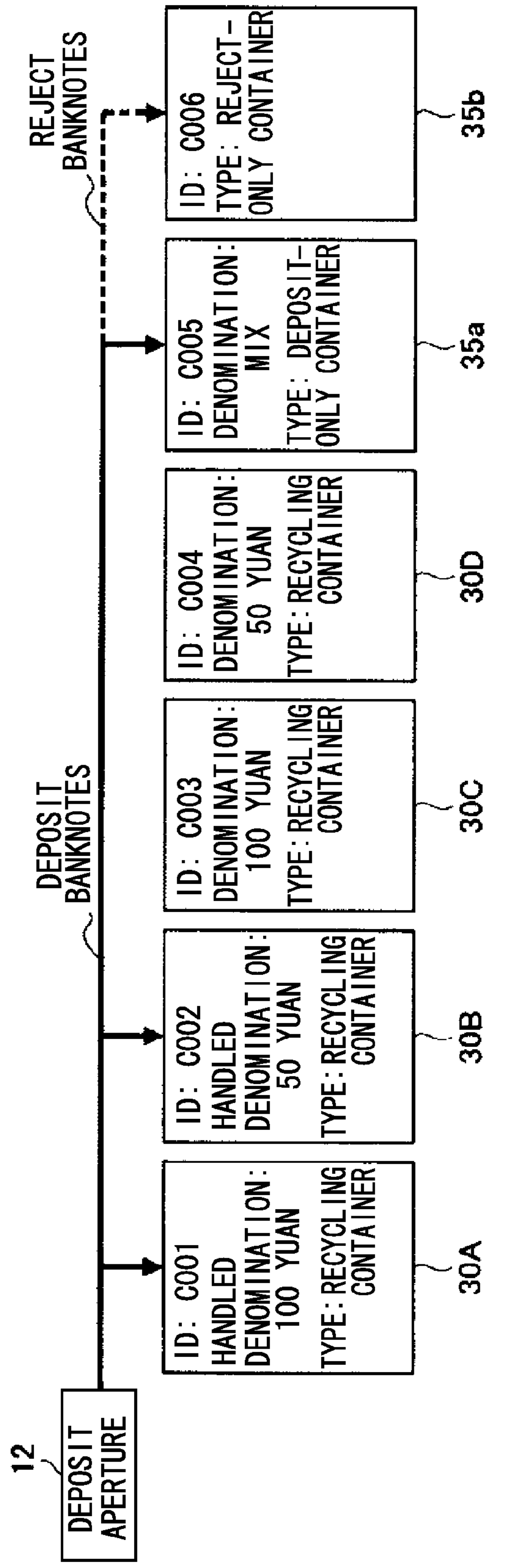
FIG. 4A is a schematic diagram for describing examples of the conveyance of banknotes during deposit processing according to the first exemplary embodiment.
Figure 4B:
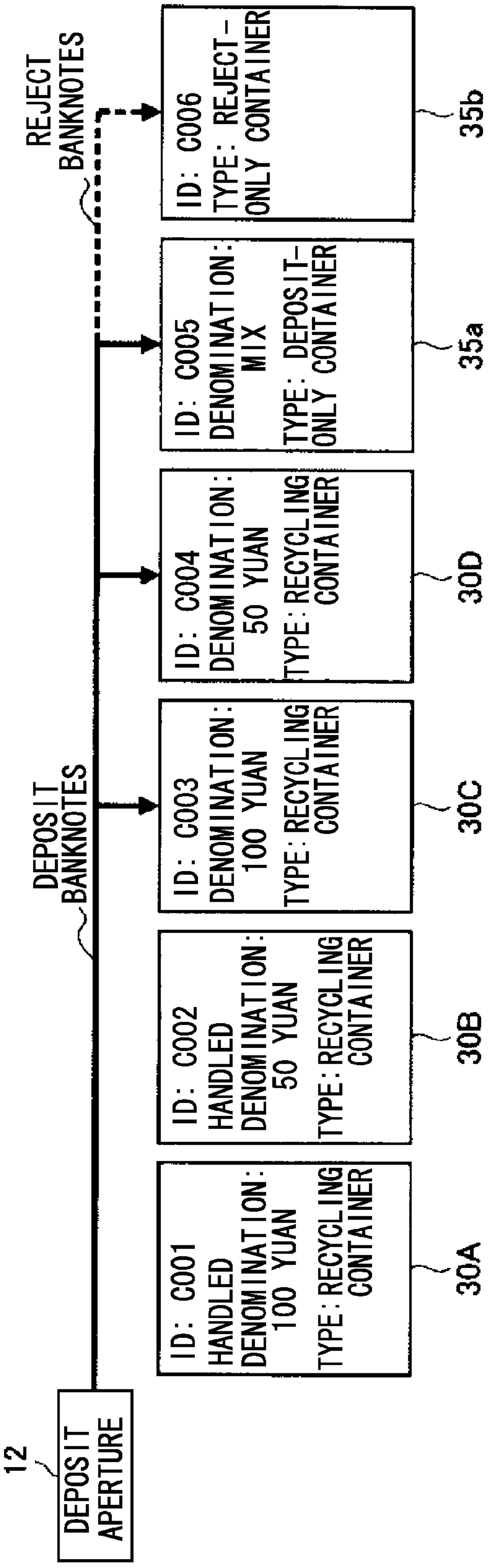
FIG. 4B is a schematic diagram for describing examples of the conveyance of banknotes during deposit processing according to the first exemplary embodiment.

FIG. 4A and FIG. 4B are schematic diagrams for describing examples of conveyance of banknotes during deposit processing in accordance with the first embodiment. FIG. 4A illustrates an example of the conveyance of banknotes during a deposit process by staff member S1, and FIG. 4B illustrates an example of the conveyance of banknotes during a deposit process by staff member S2.

During a deposit process by the staff member S1, as shown in FIG. 4A, a deposit target banknote inserted in the deposit aperture 12 is conveyed to one or other of the banknote cassettes 30A and 30B that are dedicated cassettes for staff member S1 and the banknote storage container 35*a* and reject container 35*b* that are common cassettes. Specifically, when the deposit target banknote is a 100 Yuan banknote, the banknote is conveyed to the banknote cassette 30A, and when the deposit target banknote is a 50 Yuan banknote, the banknote is conveyed to the banknote cassette 30B. When the deposit target banknote is a note other than 50 Yuan or 100 Yuan and when the banknote cannot be stored in the banknote cassette 30A or 30B, the banknote is conveyed to the banknote storage container 35*a*. If the deposit target banknote is a reject banknote, the banknote is conveyed to the reject container 35*b*.

Similarly, during a deposit process by the staff member S2, as shown in FIG. 4B, a deposit target banknote inserted in the deposit aperture 12 is conveyed to one or other of the banknote cassettes 30C and 30D that are dedicated cassettes for staff member S2 and the banknote storage container 35*a* and reject container 35*b* that are common cassettes. Specifically, when the deposit target banknote is a 100 Yuan banknote, the banknote is conveyed to the banknote cassette 30C, and when the deposit target banknote is a 50 Yuan banknote, the banknote is conveyed to the banknote cassette 30D. When the deposit target banknote is a note other than 50 Yuan or 100 Yuan and when the banknote cannot be stored in the banknote cassette 30C or 30D, the banknote is conveyed to the banknote storage container 35*a*. If the deposit target banknote is a reject banknote, the banknote is conveyed to the reject container 35*b*.

—Flow of Banknotes During Withdrawal Processing—

Figure 5A:
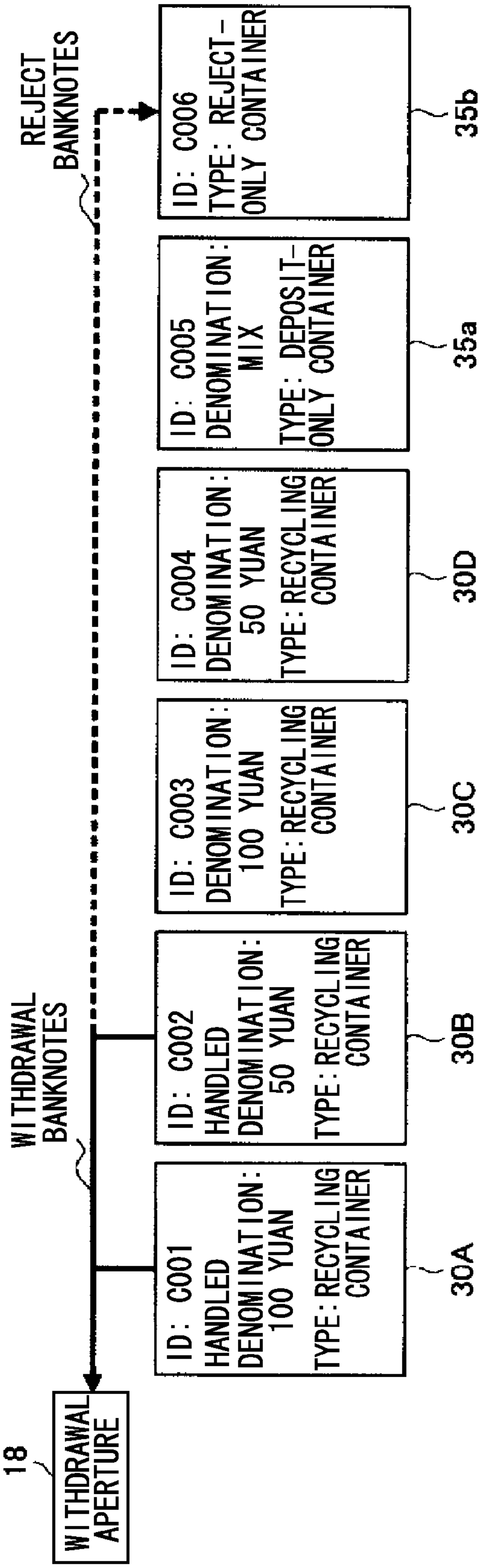
FIG. 5A is a schematic diagram for describing examples of the conveyance of banknotes during withdrawal processing according to the first exemplary embodiment.
Figure 5B:
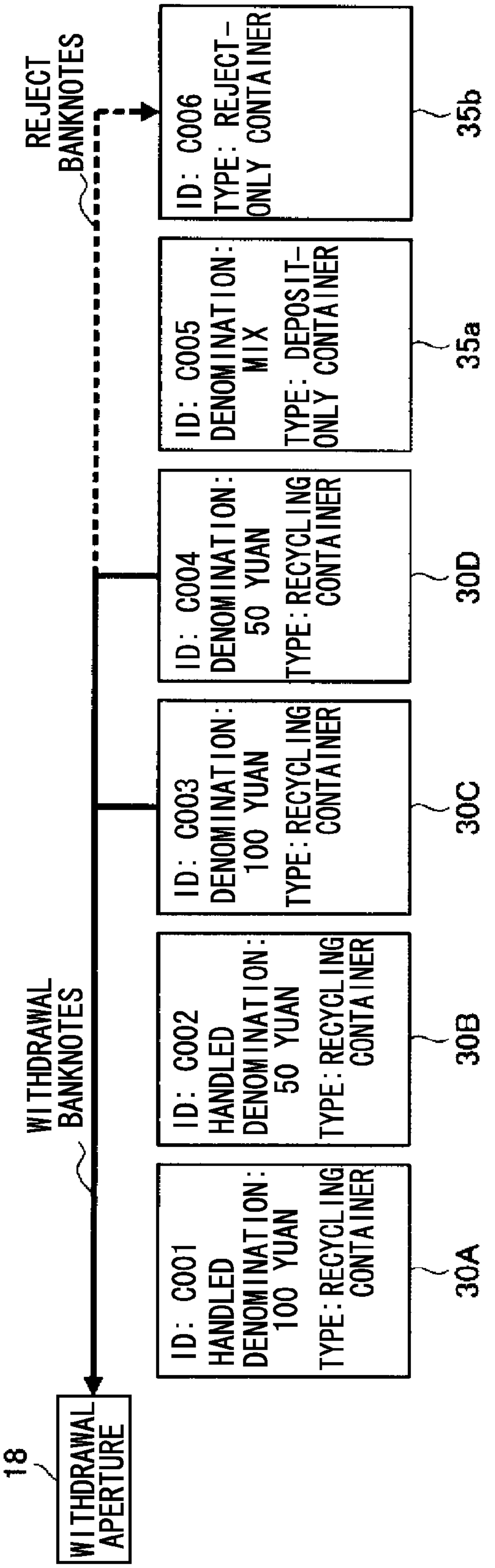
FIG. 5B is a schematic diagram for describing examples of the conveyance of banknotes during withdrawal processing according to the first exemplary embodiment.

FIG. 5A and FIG. 5B are schematic diagrams for describing examples of conveyance of banknotes during withdrawal processing in accordance with the first embodiment. FIG. 5A illustrates an example of the conveyance of banknotes during a withdrawal process by staff member S1, and FIG. 5B illustrates an example of the conveyance of banknotes during a withdrawal process by staff member S2.

During a withdrawal process by the staff member S1, as shown in FIG. 5A, a banknote cassette that feeds out a withdrawal target banknote to be conveyed to the withdrawal aperture 18 is one of the banknote cassettes 30A and 30B that are dedicated cassettes for staff member S1. Specifically, when the withdrawal target banknote is a 100 Yuan banknote, the banknote is fed out from the banknote cassette 30A, and when the withdrawal target banknote is a 50 Yuan banknote, the banknote is fed out from the banknote cassette 30B. If the fed banknote is not a reject banknote, the banknote is conveyed to the withdrawal aperture 18, but if the fed banknote is a reject banknote, the banknote is conveyed to the reject container 35*b*.

Similarly, during a withdrawal process by the staff member S2, as shown in FIG. 5B, a banknote cassette that feeds out a withdrawal target banknote to be conveyed to the withdrawal aperture 18 is one of the banknote cassettes 30C and 30D that are dedicated cassettes for staff member S2. Specifically, when the withdrawal target banknote is a 100 Yuan banknote, the banknote is fed out from the banknote cassette 30C, and when the withdrawal target banknote is a 50 Yuan banknote, the banknote is fed out from the banknote cassette 30D. If the fed banknote is not a reject banknote, the banknote is conveyed to the withdrawal aperture 18, but if the fed banknote is a reject banknote, the banknote is conveyed to the reject container 35*b*.

As described above, in the first exemplary embodiment, the banknote cassettes 30A and 30B are applied as dedicated cassettes for staff member S1, and the banknote cassettes 30C and 30D are applied as dedicated cassettes for staff member S2. Therefore, banknotes that may be handled by staff member S1 are stored in the banknote cassettes 30A and 30B, and banknotes that may be handled by staff member S2 are stored in the banknote cassettes 30C and 30D. Thus, the staff members S1 and S2 can easily discern the deposits, withdrawals and the like of banknotes that each is responsible for handling. Moreover, the staff members S1 and S2 may easily remove banknote cassettes that store only the banknotes that each is responsible for handling, and recover only the banknotes that each is responsible for handling from those banknote cassettes.

In the first embodiment, the banknote storage container 35*a* and the reject container 35*b* are applied as common cassettes for the staff members S1 and S2. As a result, banknotes that the respective staff members S1 and S2 are responsible for handling are mixed together. However, in the first exemplary embodiment, the banknotes stored in the banknote storage container 35*a* and the reject container 35*b* may be identified as the banknotes that each of the staff members S1 and S2 is responsible for handling on the basis of a table as illustrated in FIG. 6 and a table as illustrated in FIG. 7.

FIG. 6 is a diagram for describing an example of correspondences between user IDs and process information. The user ID "T001" in table T1 in FIG. 6 corresponds to staff member S1, and the user ID "T002" corresponds to staff member S2. In FIG. 6, correspondences are shown for the staff members S1 and S2 commanding deposit processes and withdrawal processes from the service terminals 90*a* and 90*b*. For example, the table in FIG. 6 shows staff member S1 commanding deposit process (1) and staff member S1 commanding deposit process (2).

FIG. 7 is a diagram for describing an example of correspondences between stacking position information and banknote information of banknotes in a common cassette. In table T2 in FIG. 7, as an example, banknote information including denominations, serial numbers, and transaction processes of the banknotes stored in the reject container 35*b* is memorized in stacking order. For example, the table in FIG. 7 shows that the denomination of a banknote whose stacking position in the reject container 35*b* is "1" is 20 Yuan, that the serial number of the banknote is "0001", and that the banknote was stored by deposit process (1). Herein, "serial numbers" are consecutive numbers for identifying individual banknotes.

Table T1 of FIG. 6 and table T2 of FIG. 7 are memorized in a memory section 80 (see FIG. 9) of the banknote processing device 10. By reference to table T1 and table T2 memorized in the memory section 80, it can be identified which of the staff members S1 and S2 is responsible for handling a banknote stored in the common cassettes. Specifically, by a display screen S illustrated in FIG. 8 being displayed at a display section of the service terminal 90*a* (or 90*b*), the staff member S1 (or S2) may easily identify the banknotes that they are responsible for handling.

FIG. 8 is a diagram for describing an example of a display screen showing correspondences between user IDs and banknote information of banknotes in a common cassette. The display screen S in FIG. 8 is displayed at the service terminal 90*a* (or 90*b*), and shows correspondences between banknote information of the banknotes stored in the reject container 35*b* and user IDs. For example, it is shown that the banknote whose stacking position in the reject container 35*b* is "1" is a banknote that staff member S1 is responsible for handling.

1-4. Example of Functional Structures of the Banknote Processing Device

Figure 9:
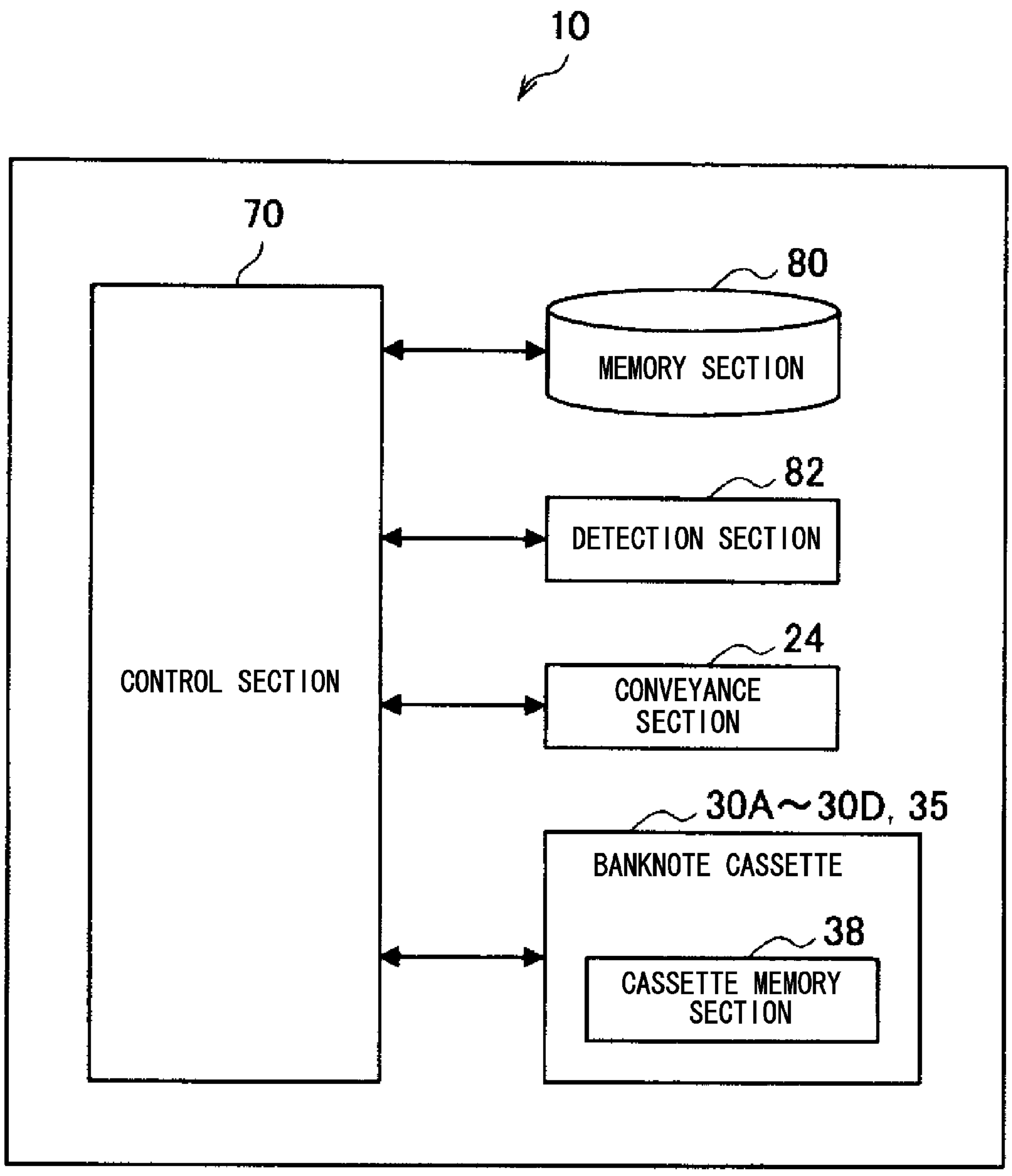
FIG. 9 is a block diagram showing an example of functional structures of the banknote processing device 10.

An example of functional structures of the banknote processing device 10 is described while referring to FIG. 9. FIG. 9 is a block diagram showing the example of functional structures of the banknote processing device 10. As shown in FIG. 9, the banknote processing device 10 is equipped with a control section 70, the memory section 80 and a detection section 82.

The control section 70 controls overall operations of the banknote processing device 10. Specifically, the control section 70 controls basic operations such as deposit processing, withdrawal processing, re-stocking processing, recovery processing and the like. For example, the control section 70 controls the feeding of banknotes by the banknote cassettes 30A to 30D and 35 and the conveyance of banknotes by the conveyance section 24.

The memory section 80 memorizes a program for operating the banknote processing device 10, and suchlike. The memory section 80 also memorizes information relating to banknotes stored in the banknote cassettes 30A to 30D (information such as numbers of banknotes, serial numbers of the banknotes and so forth). In this example, the memory section 80 memorizes information representing whether banknotes stored in the common cassettes (the banknote storage container 35*a* and the reject container 35*b*) have been processed in accordance with commands from staff member S1 or staff member S2.

The detection section 82 includes, for example, optical sensors and the like, and detects various conditions. For example, the detection section 82 detects stacking states (stacked numbers and the like) of banknotes in the banknote cassettes 30A to 30D. The detection section 82 also detects conveyance states of the banknotes.

The banknote cassettes 30A to 30D and 35 include cassette memory sections 38 that memorize information relating to the stored banknotes. When, for example, one of the banknote cassettes 30A to 30D and 35 is mounted, the control section 70 reads information memorized in that cassette memory section 38, and writes information to that cassette memory section 38.

The functions of the above-described control section 70 and the memory section 80 may be realized by a hardware structure formed of a central processing unit (CPU), read-only memory (ROM), random access memory (RAM) and suchlike. The CPU has computation functions and control functions, and controls overall operations of the banknote processing device 10 in accordance with various programs. The ROM memorizes programs, computation parameters and the like to be used by the CPU. The RAM temporarily memorizes programs used for execution by the CPU, parameters that are altered as appropriate in the execution of programs, and the like.

1-5. Examples of Operation of the First Exemplary Embodiment

Below, as examples of operation of the banknote processing device 10 according to the first exemplary embodiment, examples of deposit processing and withdrawal processing of banknotes are described.

Before the banknote processing device 10 starts deposit processing, withdrawal processing and the like, the staff members S1 and S2 at the service terminals 90*a* and 90*b* load banknotes in their dedicated banknote cassettes 30A to 30D and associate the banknote cassettes 30A to 30D with their user IDs. Accordingly, first, a flow of loading of the banknote cassettes 30A to 30D in accordance with the first exemplary embodiment is described while referring to FIG. 10.

—Flow of Loading of Banknote Cassettes—

Figure 10:
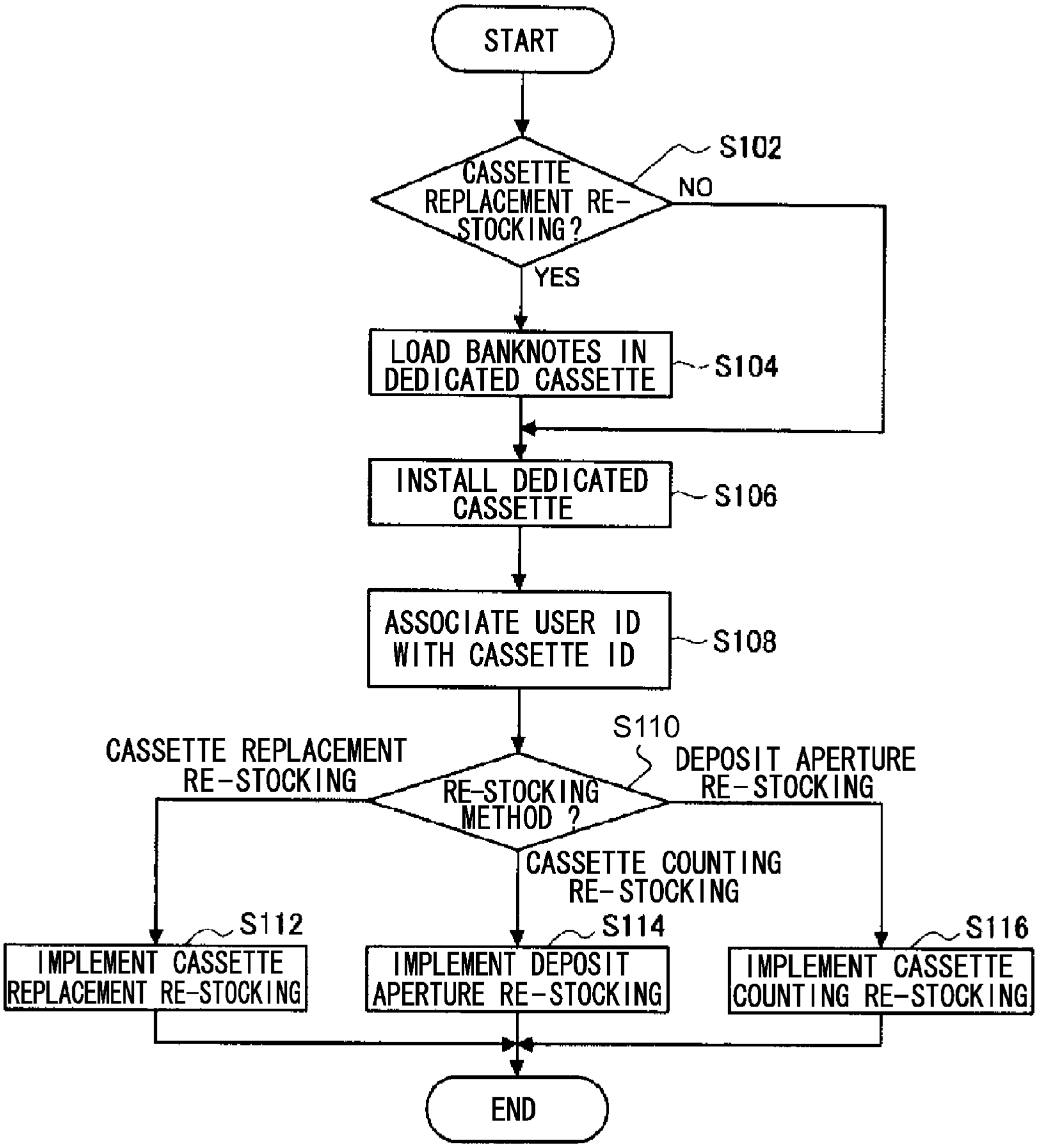
FIG. 10 is a flowchart showing a flow of loading of banknote cassettes 30A to 30D according to the first exemplary embodiment.

FIG. 10 is a flowchart showing the flow of loading of the banknote cassettes 30A to 30D in accordance with the first exemplary embodiment. In this case, staff member S1 is loading banknotes in their dedicated banknote cassettes 30A and 30B.

In a case in which re-stocking of the banknotes in the banknote cassettes 30A and 30B by the staff member S1 is cassette replacement re-stocking ("Yes" in step S102), staff member S1 loads banknotes in their dedicated banknote cassettes 30A and 30B (step S104), and staff member S1 installs the banknote cassettes 30A and 30B loaded with the banknotes in the banknote processing device 10 (step S106).

Then, staff member S1 associates the cassette IDs of the banknote cassettes 30A and 30B with staff member S1's user ID (step S108), thus registering their dedicated banknote cassettes 30A and 30B. Specifically, staff member S1 registers their user ID with each of their dedicated banknote cassettes in a registration screen 210 at the service terminal 90*a*, illustrated in FIG. 11.

Figure 11:
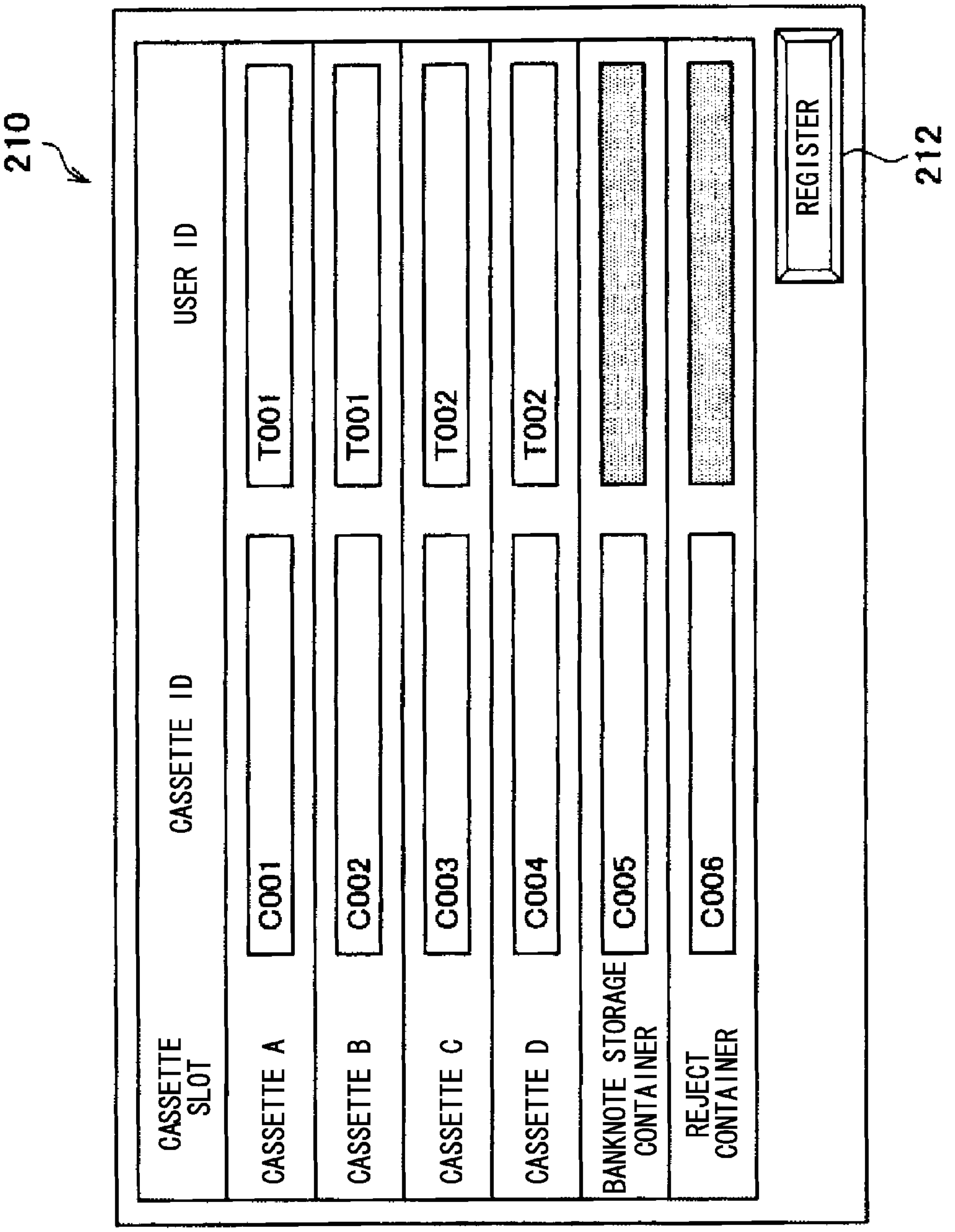
FIG. 11 is a diagram showing an example of a registration screen 210 for cassette IDs and user IDs.

FIG. 11 is a view showing an example of the registration screen 210 for cassette IDs and user IDs. In the registration screen 210, a user ID may be inputted for each banknote cassette. For example, in FIG. 11, staff member S1 inputs "T001" as the user ID corresponding with their dedicated banknote cassette 30A. When staff number S1 presses a "Register" button 212, the inputted cassette IDs are registered. The cassette IDs are pre-specified in FIG. 11, but cassette IDs may be inputted by staff members.

Now description returns to the flowchart of FIG. 10. After staff member S1 has registered their user ID, staff member S1 carries out operations in accordance with the method of re-stocking banknotes (step S110 to step S116). That is, in the case in which the re-stocking method is cassette replacement re-stocking, staff member S1 registers, for example, the denominations and numbers of the banknotes loaded in the banknote cassettes 30A and 30B in a display screen at the service terminal 90*a* (step S112). The registration of denominations and numbers of banknotes is carried out, for example, directly after the registration of the user ID.

On the other hand, in a case in which the banknote re-stocking method is deposit aperture re-stocking, staff member S1 inserts the banknotes in the deposit aperture 12 and the banknotes are re-stocked by the banknotes from the deposit aperture 12 being stacked into the banknote cassettes 30A and 30B (step S114). Further, in a case in which the re-stocking method is cassette counting re-stocking, banknotes stored in the banknote storage container 35*a* are re-stocked by being stacked into the banknote cassettes 30A and 30B (step S116).

When the re-stocking method is deposit aperture re-stocking or cassette counting re-stocking, the banknotes are verified by the banknote verification section 20 while being conveyed from the deposit aperture 12 or the banknote storage container 35*a* to the banknote cassettes 30A and 30B. Thus, the banknote processing device 10 may acquire the denominations, serial numbers and the like of the banknotes stocked in the banknote cassettes 30A and 30B. Therefore, in contrast to the case of cassette replacement re-stocking, there is no need for staff member S1 to register denominations, numbers and the like of the banknotes.

Hereabove, the flow of loading of banknotes into the banknote cassettes 30A and 30B that are the dedicated cassettes for staff member S1 is described. Loading of banknotes into the banknote cassettes 30C and 30D that are the dedicated cassettes for staff member S2 is conducted in the same manner.

—Example of Deposit Processing—

Figure 12:
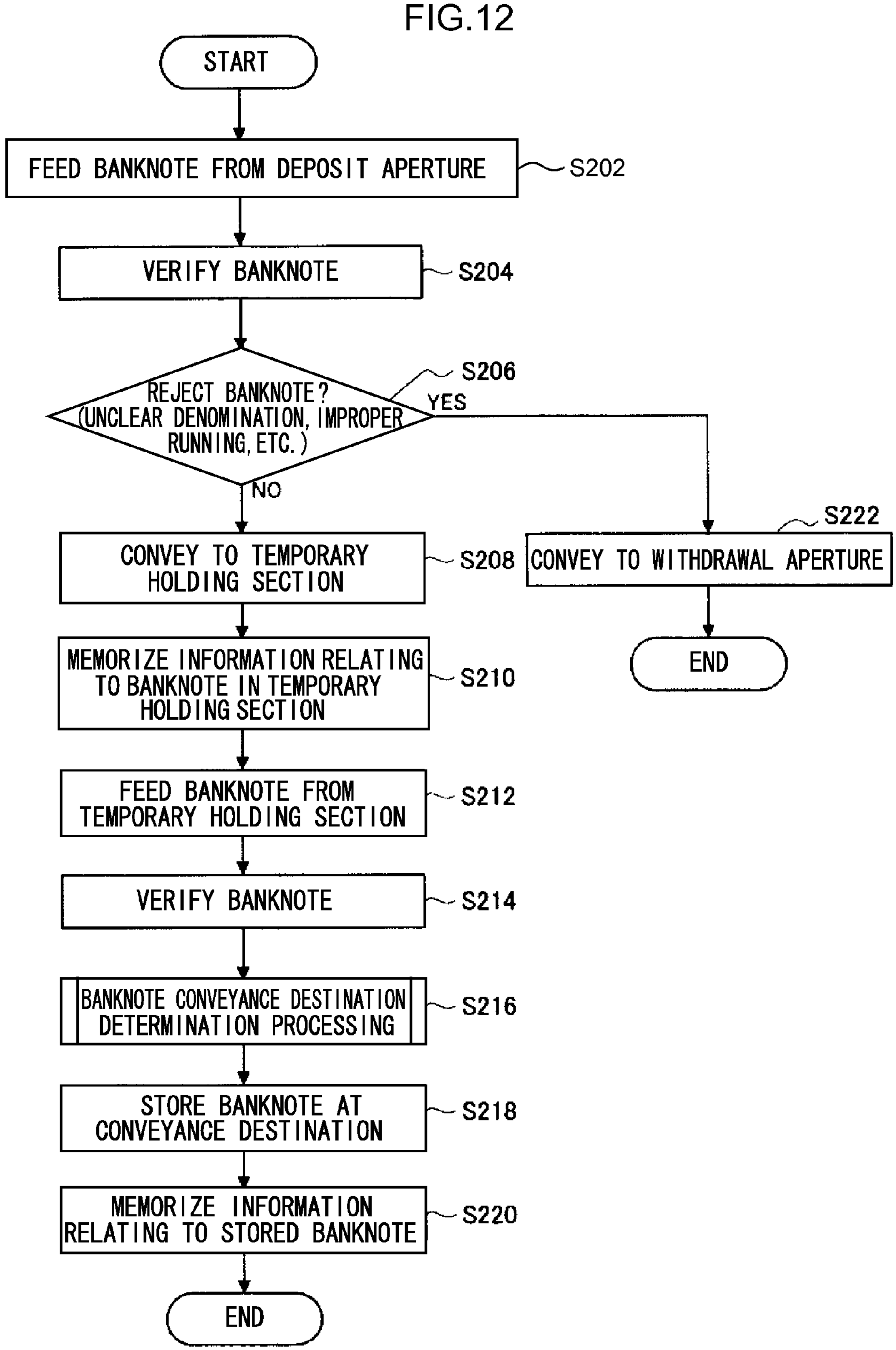
FIG. 12 is a flowchart showing an example of a deposit process according to the first exemplary embodiment.

Now, an example of deposit processing in accordance with the first exemplary embodiment is described while referring to FIG. 12. The deposit processing described here is an ordinary deposit process in which, the deposited banknotes are temporarily withdrawn to the temporary holding section 22, and then stacked from the temporary holding section 22 into the banknote cassettes 30A to 30D.

FIG. 12 is a flowchart showing an example of a deposit process in accordance with the first exemplary embodiment, specifically showing the processing corresponding to one banknote during the deposit process. The flowchart in FIG. 12 is commenced when staff member S1 (or S2) has inserted banknotes into the deposit aperture 12, and sent a deposit processing command from the service terminal 90*a* (or 90*b*) to the banknote processing device 10. At this time, an ID of the service terminal (the user ID) is also sent to the banknote processing device 10. Thus, it is known which of the staff members S1 and S2 has commanded the deposit process. Rather than the ID of the service terminal 90*a* (or 90*b*) (the user ID) being sent for each transaction, the user ID may be initially registered from the service terminal 90*a* (or 90*b*) and this information may be utilized.

In the flowchart of FIG. 12, the control section 70 of the banknote processing device 10 first feeds the banknote from the deposit aperture 12 (step S202) and verifies the banknote at the banknote verification section 20 (step S204).

Then, in accordance with a verification result at the banknote verification section 20, the control section 70 makes a determination as to whether the banknote is a reject banknote (step S206). Herein, a reject banknote is a banknote whose denomination is unclear, a banknote that is running improperly, or the like. If the result of the determination in step S206 is that the banknote is a reject banknote ("Yes"), the control section 70 conveys the banknote to the withdrawal aperture 18 (step S222).

On the other hand, if the result of the determination in step S206 is that the banknote is not a reject banknote ("No"), the control section 70 conveys the banknote to the temporary holding section 22 (step S208). Then, the control section 70 memorizes information relating to the banknote that has been conveyed to the temporary holding section 22 in the memory section 80 (step S210). This information is, for example, information relating to a stacking position of the banknote in the temporary holding section 22, information relating to the denomination and serial number of the banknote, and the like.

Next, the control section 70 feeds the banknote out from the temporary holding section 22 (step S212), and verifies the banknote at the banknote verification section 20 (step S214). On the basis of the verification result of the banknote and the user ID of the staff member who commanded the deposit process, the control section 70 then carries out conveyance destination determination processing to determine a conveyance destination of the banknote (step S216).

Figure 13:
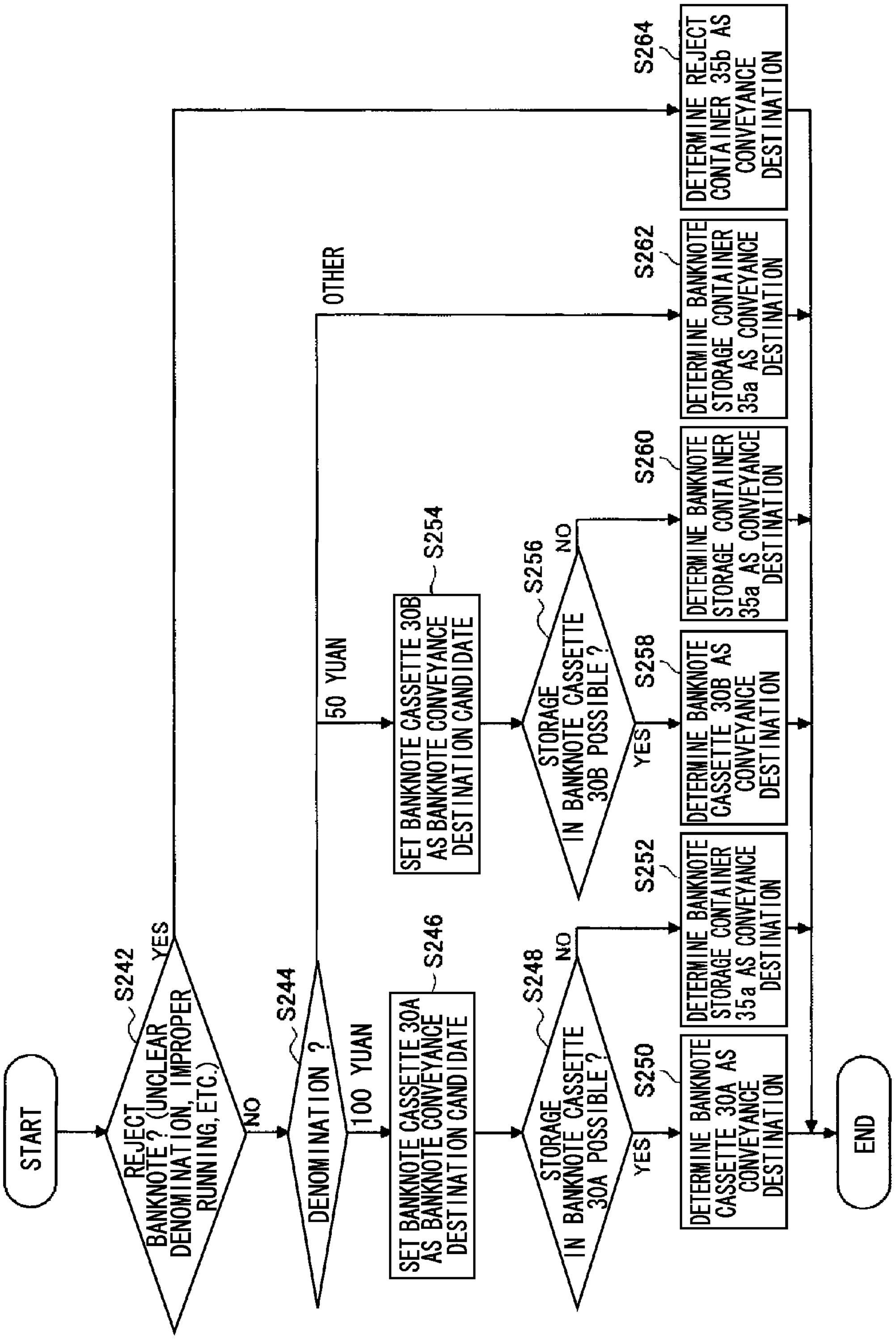
FIG. 13 is a flowchart showing conveyance destination determination processing for a banknote during a deposit process according to the first exemplary embodiment.

FIG. 13 is a flowchart showing the conveyance destination determination processing for a banknote during the deposit process in accordance with the first exemplary embodiment. The conveyance destination determination processing for a banknote in FIG. 13 is carried out when deposit processing is being conducted by staff member S1. Candidates for conveyance destinations when deposit processing is being conducted by staff member S1 are the banknote cassettes 30A and 30B that are the dedicated cassettes for staff member S1 and the banknote storage container 35*a* and reject container 35*b* that are the common cassettes.

In the flowchart of FIG. 13, the control section 70 makes a determination as to whether the banknote is a reject banknote (step S242). If the result of the determination in step S242 is that the banknote is a reject banknote ("Yes"), the control section 70 determines that the conveyance destination of the banknote is the reject container 35*b* that is a common cassette (step S264).

On the other hand, if the result of the determination in step S242 is that the banknote is not a reject banknote ("No"), the control section 70 determines the denomination of the banknote (step S244). If the result of the determination in step S244 is that the denomination of the banknote is 100 Yuan, the control section 70 sets the banknote cassette 30A that is a dedicated cassette for staff member S1 as a conveyance destination candidate (step S246).

Then, the control section 70 makes a determination as to whether it is possible to store the banknote in the banknote cassette 30A (step S248). That is, the control section 70 makes a determination as to whether a maximum storable number of banknotes is already stored in the banknote cassette 30A. If the result of the determination in step S248 is that the banknote cassette 30A can store the banknote ("Yes"), the control section 70 determines that the conveyance destination is the banknote cassette 30A (step S250). On the other hand, if the result of the determination in step S248 is that the banknote cassette 30A cannot store the banknote ("No"), the control section 70 determines that the conveyance destination is the banknote storage container 35*a* that is a common cassette (step S252).

If the result of the determination in step S244 is that the denomination of the banknote is 50 Yuan, the control section 70 sets the banknote cassette 30B that is a dedicated cassette for staff member S1 as a conveyance destination candidate (step S254). Then, if the banknote cassette 30B can store the banknote ("Yes" in step S256), the control section 70 determines that the conveyance destination is the banknote cassette 30B (step S258), but if the banknote cassette 30B cannot store the banknote ("No" in step S256), the control section 70 determines that the conveyance destination is the banknote storage container 35*a* that is a common cassette (step S260).

If the denomination of the banknote in step S244 is a denomination other than 100 Yuan or 50 Yuan, the control section 70 determines that the conveyance destination is the banknote storage container 35*a* (step S262). Thus, the conveyance destination of the banknote is determined on the basis of the user ID of staff member S1 and the results of verification of the banknote.

In the above description, the conveyance destination determination processing for a banknote when a deposit process is being conducted by staff member S1 is described. Conveyance destination determination processing for a banknote when a deposit process is being conducted by staff member S2 is similar. However, the conveyance destination candidates when a deposit process is being conducted by staff member S2 are the banknote cassettes 30C and 30D that are the dedicated cassettes for staff member S2 and the banknote storage container 35*a* and reject container 35*b* that are the common cassettes.

Returning to the flowchart in FIG. 12, the description of deposit processing is continued. When the control section 70 has determined the conveyance destination by the conveyance destination determination processing (step S216), the banknote is conveyed to the determined conveyance destination and stored (step S218). Then, the control section 70 memorizes information relating to the stored banknote in the memory section 80 (step S220). This information is, for example, information relating to a storage position of the banknote in the storage destination, information relating to the denomination and serial number of the banknote, and the like.

The control section 70 applies the processing described above to all deposit target banknotes. When all the banknotes have been conveyed to the specified conveyance destinations, this sequence of deposit processing ends.

—Example of Withdrawal Processing—

Figure 14:
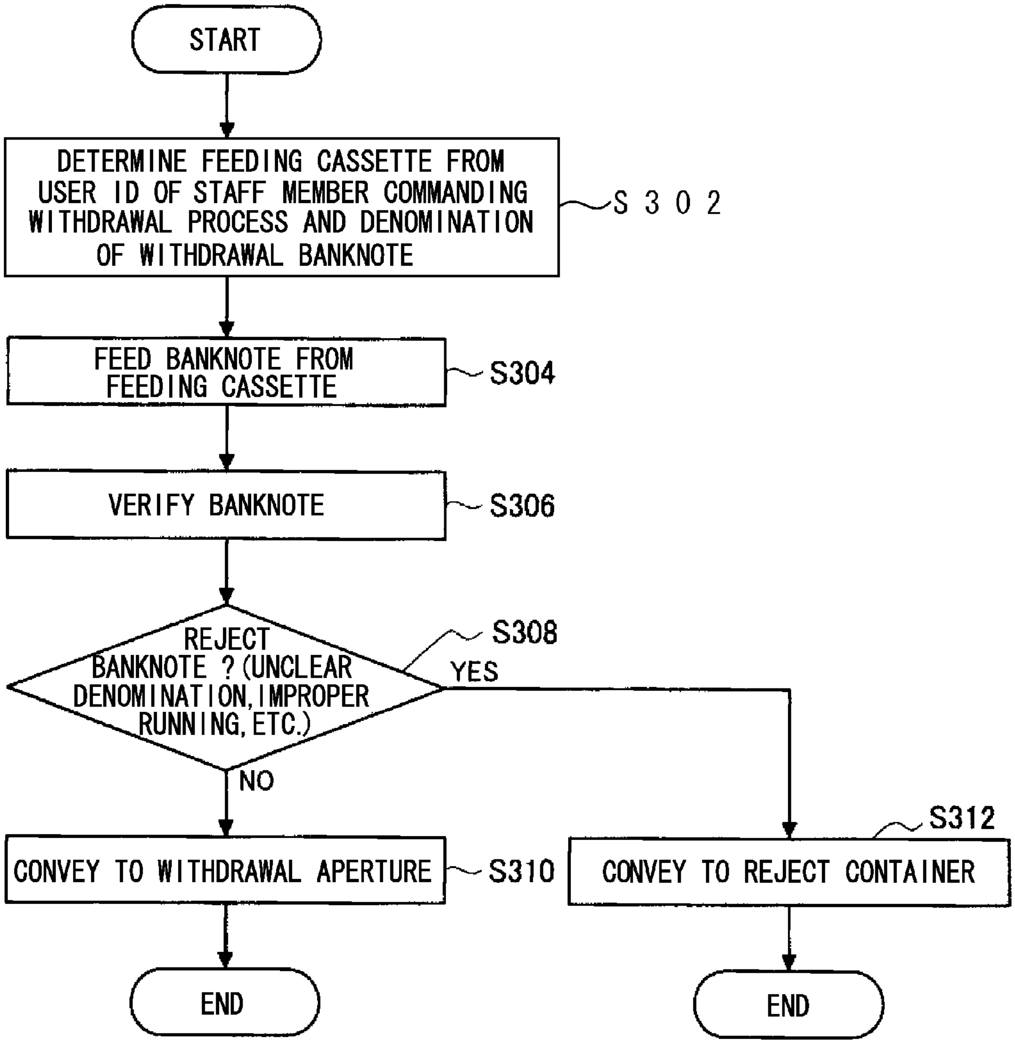
FIG. 14 is a flowchart showing an example of a deposit process according to the first exemplary embodiment.

Now, an example of withdrawal processing in accordance with the first exemplary embodiment is described while referring to FIG. 14.

FIG. 14 is a flowchart showing an example of a withdrawal process in accordance with the first exemplary embodiment, specifically showing the processing corresponding to one banknote during the withdrawal process. The flowchart in FIG. 14 is commenced when staff member S1 (or S2) has sent a withdrawal processing command from the service terminal 90*a* (or 90*b*) to the banknote processing device 10. At this time, the ID of the service terminal (the user ID) is also sent to the banknote processing device 10. Thus, it is known which of the staff members S1 and S2 has commanded the withdrawal process. Rather than the ID (the user ID) of the service terminal 90*a* (or 90*b*) being sent for each transaction, the user ID may be initially registered from the service terminal 90*a* (or 90*b*), and this information may be utilized.

In the flowchart of FIG. 14, the control section 70 determines which banknote cassette is to feed out a banknote on the basis of the user ID of the staff member commanding the withdrawal process and the denomination of the withdrawal target banknote (step S302). Banknote cassettes that feed out banknotes in this case are the banknote cassettes 30A and 30B that are dedicated cassettes for staff member S1, and the banknote cassettes 30C and 30D that are dedicated cassettes for staff member S2. In a case in which staff member S1 commands a withdrawal process that withdraws a 100 Yuan banknote, the banknote cassette 30A is determined to be the banknote cassette that feeds out the banknote. Alternatively, in a case in which staff member S1 commands a withdrawal process that withdraws a 100 Yuan banknote, the banknote cassette 30B is determined. Note that the staff member-dedicated cassettes may be commanded from a higher-level terminal (the service terminal). In such a case, there is no need for the banknote cassettes that feed out banknotes to be specified from the denominations by the banknote processing device 10.

Then, the control section 70 feeds a banknote from the determined banknote cassette (step S304) and verifies the banknote at the banknote verification section 20 (step S306). In accordance with the verification result at the banknote verification section 20, the control section 70 makes a determination (step S308) as to whether the banknote is a reject banknote (a banknote whose denomination is unclear, a banknote that is running improperly, or the like).

If the result of the determination in step S308 is that the banknote is a reject banknote ("Yes"), the control section 70 conveys the banknote to the reject container 35*b* (step S312). On the other hand, if the result of the determination in step S308 is that the banknote is not a reject banknote ("No"), the control section 70 conveys the banknote to the withdrawal aperture 18 (step S310).

The control section 70 applies the processing described above to all withdrawal target banknotes. When all the banknotes have been conveyed to the specified conveyance destinations, this sequence of withdrawal processing ends.

In the above descriptions, reject banknotes with unclear denominations are conveyed to the reject container 35*b*, but this is not limiting. For example, reject banknotes whose denominations, numbers or the like are unclear may be temporarily conveyed to the temporary holding section 22 and then verified again at the banknote verification section 20, and stored in the reject container 35*b* after the denominations, numbers and the like of the banknotes have been established. Thus, denominations, numbers and the like of banknotes stored in the reject container 35*b* may be administered.

1-6. Effects of the First Exemplary Embodiment

As shown in FIG. 1, the banknote processing device 10 according to the first exemplary embodiment described above is equipped with the plural banknote cassettes 30A to 30D and 35 that store banknotes. The plural banknote cassettes include the banknote cassettes 30A and 30B that store only banknotes that are processed in accordance with commands from, of the staff members S1 and S2, the staff member S1, and the banknote cassettes 30C and 30D that store only banknotes that are processed in accordance with commands from the staff member S2. That is, the plural banknote cassettes include a dedicated cassette for each staff member.

Therefore, the banknotes being deposited and withdrawn in accordance with commands from staff member S1 and the banknotes being deposited and withdrawn in accordance with commands from staff member S2 are stored in the respective dedicated cassettes and may be prevented from mixing together. Consequently, even when banknotes are being processed in accordance with commands from plural staff members, the banknotes that each staff member is responsible for handling may be easily identified. Moreover, because dedicated cassettes are employed, recovery processing, re-stocking processing and the like may be performed cassette by cassette, and usability of the banknote processing device 10 may be improved.

The plural cassettes include, in addition to the dedicated cassettes, the banknote storage container 35*a* and reject container 35*b* (common cassettes) that store both banknotes that are processed in accordance with commands from staff member S1 and banknotes that are processed in accordance with commands from staff member S2. A common cassette stores, for example, reject banknotes, in which case banknotes apart from reject banknotes and the like may be stored in the dedicated cassettes by the cassettes that store banknotes being selected in accordance with processing conditions. Thus, the banknotes that each staff member is responsible for handling may be identified even more easily.

In the first exemplary embodiment, the memory section 80 memorizes information relating to banknotes stored in the banknote storage container 35*a* that is a common cassette. Therefore, of banknotes stored in the banknote storage container 35*a*, banknotes that have been stored as a result of the commands of one or other of staff member S1 and staff member S2 may be identified.

2. Second Exemplary Embodiment

Figure 15:
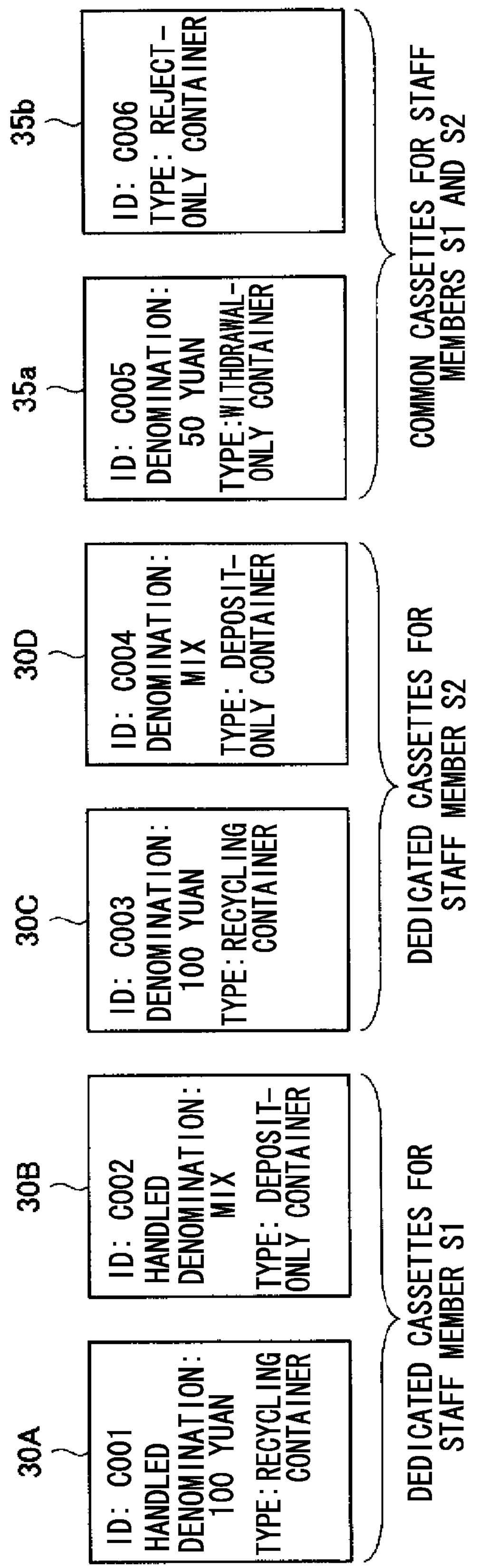
FIG. 15 is a schematic diagram for describing an example of application of the banknote cassettes 30A to 30D and 35 according to a second exemplary embodiment.

An example of application of banknote cassettes in accordance with a second exemplary embodiment is described while referring to FIG. 15. In the second exemplary embodiment, structures other than the banknote cassettes 30A to 30D and 35 are the same as in the first exemplary embodiment, and detailed descriptions thereof are not given.

FIG. 15 is a schematic diagram for describing an example of application of the banknote cassettes 30A to 30D and 35 in accordance with the second exemplary embodiment. In the second exemplary embodiment, similarly to the first exemplary embodiment, the banknote cassettes 30A and 30B are applied as dedicated cassettes for staff member S1, the banknote cassettes 30C and 30D are applied as dedicated cassettes for staff member S2, and the banknote storage container 35*a* and reject container 35*b* of the banknote cassette 35 are applied as common cassettes for staff members S1 and S2.

In the first exemplary embodiment, as shown in FIG. 3, the banknote cassettes 30A to 30D are recycling containers, each with a function for stacking banknotes and a function for feeding out banknotes, and the banknote storage container 35*a* is a deposit-only container with only the function of stacking banknotes. However, in the second exemplary embodiment, as shown in FIG. 15, the banknote cassettes 30A and 30C that store banknotes whose denomination is 100 Yuan are recycling containers, the banknote cassettes 30B and 30D are deposit-only containers that store banknotes of various denominations, and the banknote storage container 35*a* is a withdrawal-only container with only the function of feeding out banknotes whose denomination is 50 Yuan. In other words, the banknote storage container 35*a* is a feeding-only storage section that does not stack banknotes during deposit processing but does feed out banknotes during withdrawal processing.

Now, examples of conveyance of banknotes during deposit processing and during withdrawal processing using the banknote cassettes 30A to 30D and 35 with the above structures are described while referring to FIG. 16A, FIG. 16B, FIG. 17A and FIG. 17B.

Figure 16A:
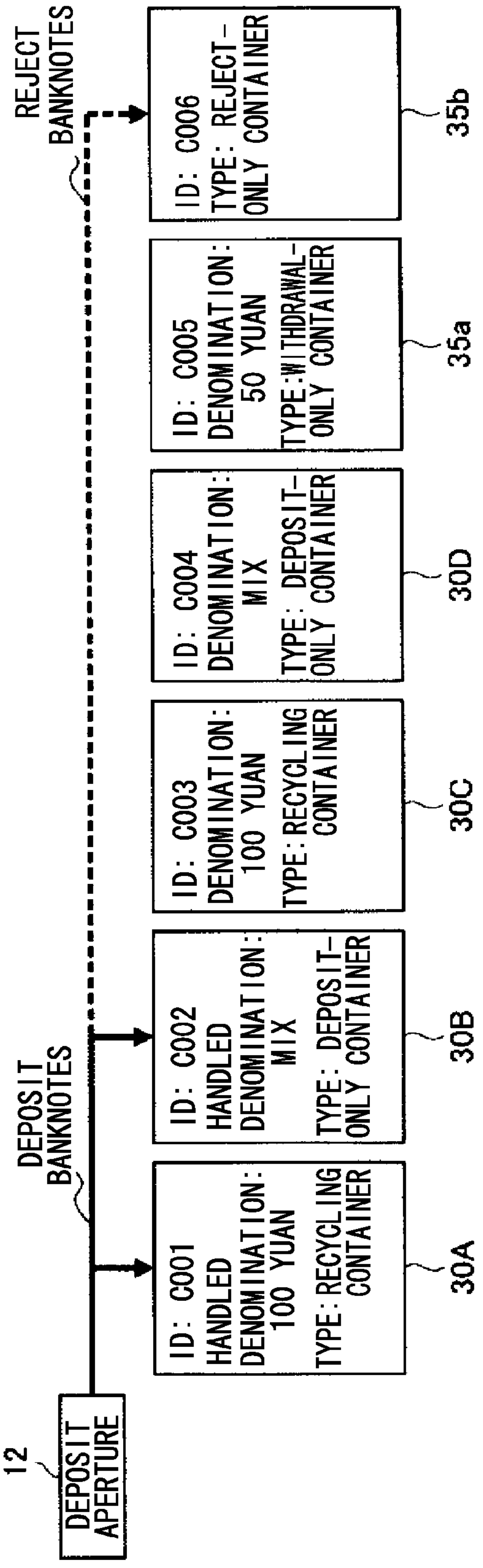
FIG. 16A is a schematic diagram for describing examples of the conveyance of banknotes during deposit processing according to the second exemplary embodiment.
Figure 16B:
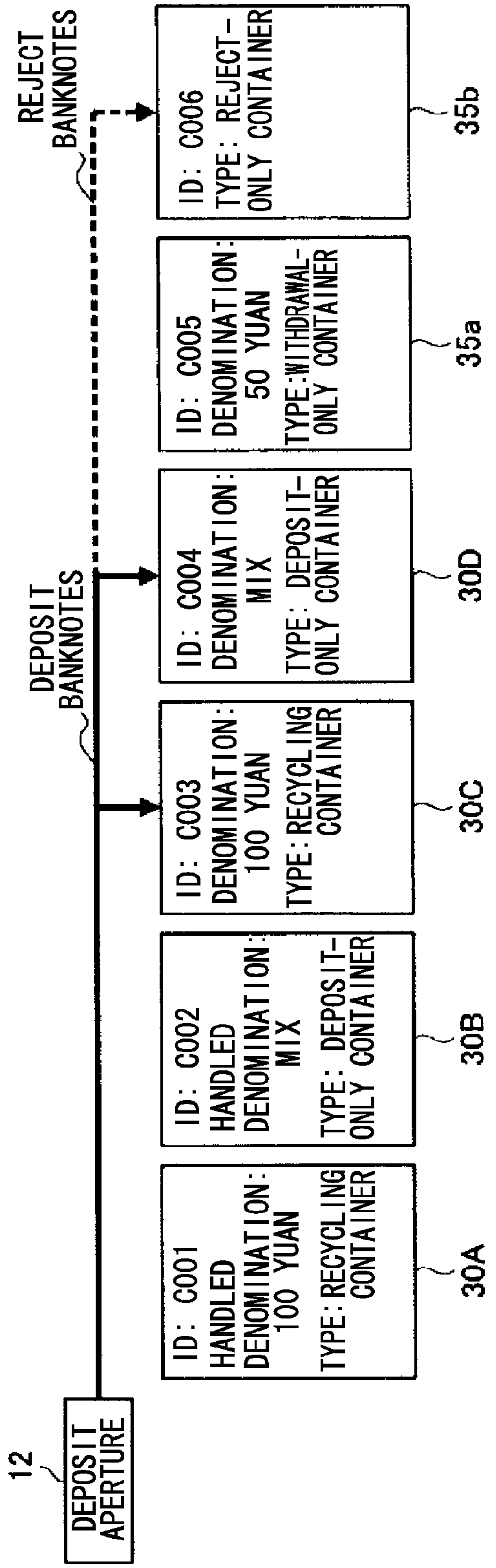
FIG. 16B is a schematic diagram for describing examples of the conveyance of banknotes during deposit processing according to the second exemplary embodiment.

FIG. 16A and FIG. 16B are schematic diagrams for describing the examples of conveyance of banknotes during deposit processing in accordance with the second exemplary embodiment. FIG. 16A illustrates an example of the conveyance of banknotes during a deposit process by staff member S1, and FIG. 16B illustrates an example of the conveyance of banknotes during a deposit process by staff member S2.

During a deposit process by staff member S1, as shown in FIG. 16A, when a deposit target banknote is a 100 Yuan banknote, the banknote is conveyed to the banknote cassette 30A. When the deposit target banknote is a banknote other than 100 Yuan, and when the banknote cannot be stored in the banknote cassette 30A, the banknote is conveyed to the banknote cassette 30B. If the deposit target banknote is a reject banknote, the banknote is conveyed to the reject container 35*b*.

Similarly, during a deposit process by staff member S2, as shown in FIG. 16B, when a deposit target banknote is a 100 Yuan banknote, the banknote is conveyed to the banknote cassette 30C. When the deposit target banknote is a banknote other than 100 Yuan, and when the banknote cannot be stored in the banknote cassette 30C, the banknote is conveyed to the banknote cassette 30D. If the deposit target banknote is a reject banknote, the banknote is conveyed to the reject container 35*b*.

Figure 17A:
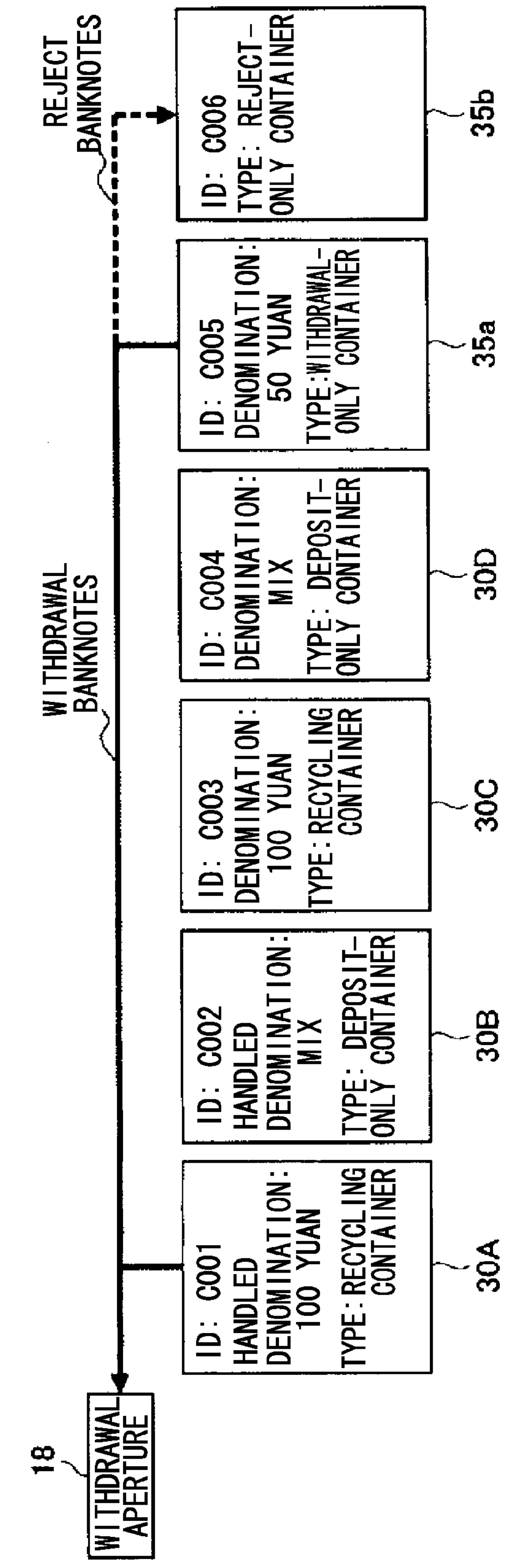
FIG. 17A is a schematic diagram for describing examples of the conveyance of banknotes during withdrawal processing according to the second exemplary embodiment.
Figure 17B:
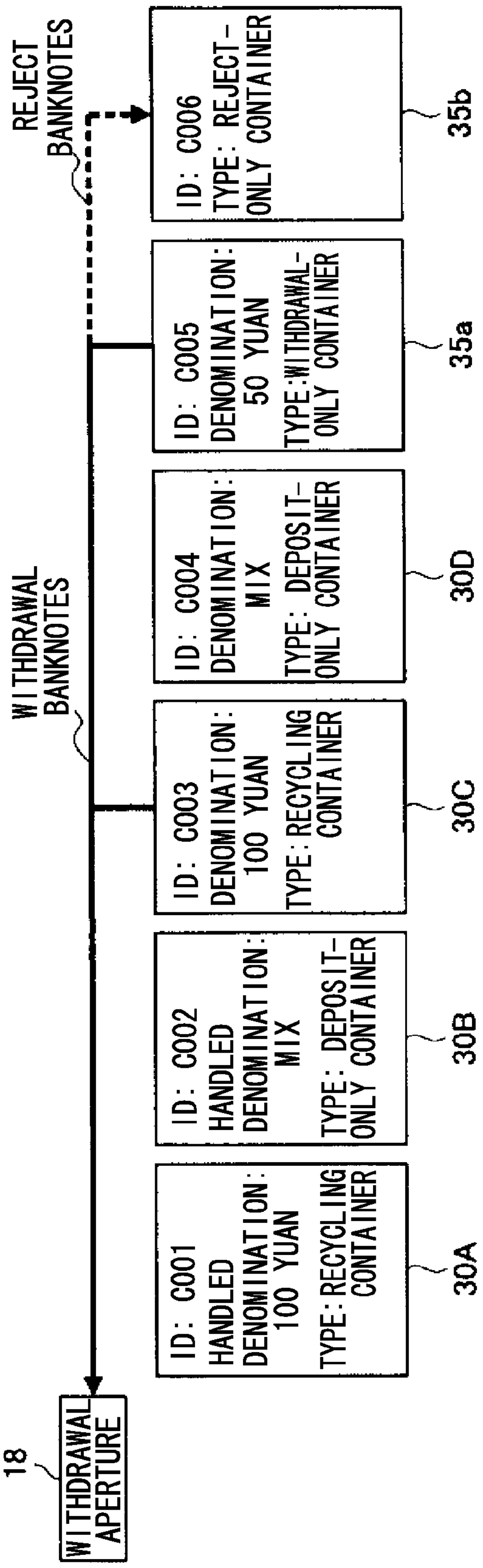
FIG. 17B is a schematic diagram for describing examples of the conveyance of banknotes during withdrawal processing according to the second exemplary embodiment.

FIG. 17A and FIG. 17B are schematic diagrams for describing the examples of conveyance of banknotes during withdrawal processing in accordance with the second exemplary embodiment. FIG. 17A illustrates an example of the conveyance of banknotes during a withdrawal process by staff member S1, and FIG. 17B illustrates an example of the conveyance of banknotes during a withdrawal process by staff member S2.

During a withdrawal process by staff member S1, as shown in FIG. 17A, when a withdrawal target banknote is a 100 Yuan banknote, a banknote is fed out from the banknote cassette 30A. When the withdrawal target banknote is a banknote other than 100 Yuan, a banknote is fed out from the banknote cassette 30B. If the fed banknote is not a reject banknote, the banknote is conveyed to the withdrawal aperture 18, but if the fed banknote is a reject banknote, the banknote is conveyed to the reject container 35*b*.

Similarly, during a withdrawal process by staff member S2, as shown in FIG. 17B, when a withdrawal target banknote is a 100 Yuan banknote, a banknote is fed out from the banknote cassette 30C. When the withdrawal target banknote is a banknote other than 100 Yuan, a banknote is fed out from the banknote cassette 30D. If the fed banknote is not a reject banknote, the banknote is conveyed to the withdrawal aperture 18, but if the fed banknote is a reject banknote, the banknote is conveyed to the reject container 35*b*.

According to the second exemplary embodiment described hereabove, deposit-only containers that store banknotes of various denominations are provided for each staff member (i.e., the banknote cassette 30B dedicated for staff member S1 and the banknote cassette 30D dedicated for staff member S2). Thus, it may easily be identified which of the banknotes in the banknote cassettes 30B and 30D each of the staff members S1 and S2 is responsible for handling.

3. Third Exemplary Embodiment

Figure 18:
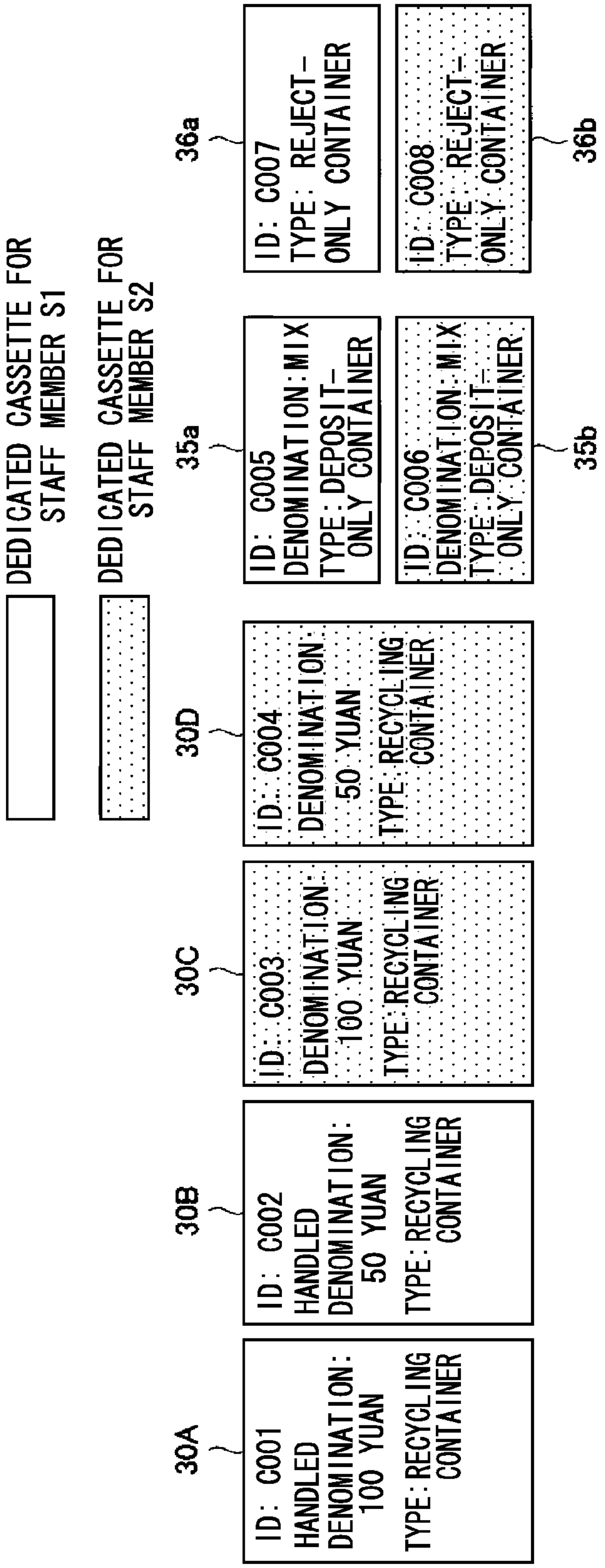
FIG. 18 is a schematic diagram for describing an example of application of banknote cassettes according to a third exemplary embodiment.

An example of application of banknote cassettes in accordance with a third exemplary embodiment is described while referring to FIG. 18. In the third exemplary embodiment, in contrast with the first exemplary embodiment in which the single banknote cassette with a reject container 35 is provided, two banknote cassettes with a reject container 35 and 36 are provided (hereinafter referred to as banknote cassettes 35 and 36). The banknote cassettes 35 and 36 include, respectively, a banknote storage container 35*a* or 36*a* and a reject container 36*a* or 36*b*. In the third exemplary embodiment, structures other than the banknote cassettes 30A to 30D, 35 and 36 are the same as in the first exemplary embodiment, and detailed descriptions thereof are not given.

FIG. 18 is a schematic diagram for describing an example of application of the banknote cassettes 30A to 30D, 35 and 36 in accordance with the third exemplary embodiment. In the third exemplary embodiment, in contrast with the first exemplary embodiment, no common cassettes for the staff members S1 and S2 are provided. In other words, the banknote cassettes are configured only as dedicated cassettes.

To be specific, as shown in FIG. 18, the banknote cassettes 30A and 30B, the banknote storage container 35*a* and the reject container 36*a* are applied as dedicated cassettes for staff member S1, and the banknote cassettes 30C and 30D, the banknote storage container 35*a* and the reject container 36*b* are applied as dedicated cassettes for staff member S2.

Now, examples of conveyance of banknotes during deposit processing and during withdrawal processing using the banknote cassettes 30A to 30D, 35 and 36 with the above structures are described while referring to FIG. 19A, FIG. 19B, FIG. 20A and FIG. 20B.

Figure 19A:
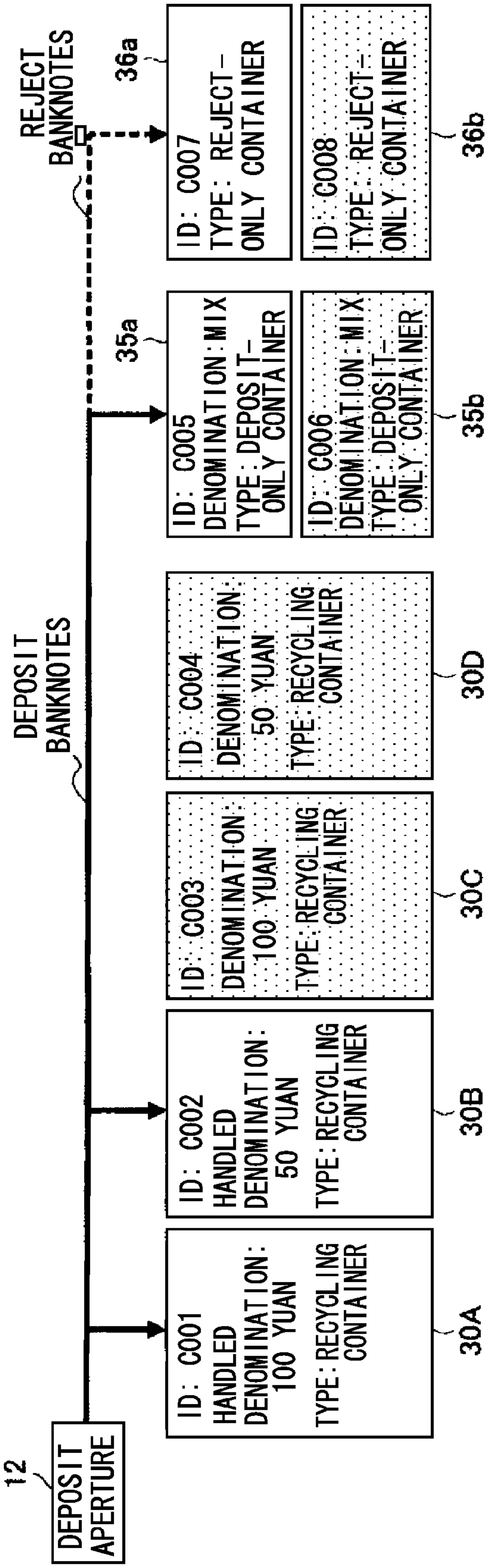
FIG. 19A is a schematic diagram for describing examples of the conveyance of banknotes during deposit processing according to the third exemplary embodiment.
Figure 19B:
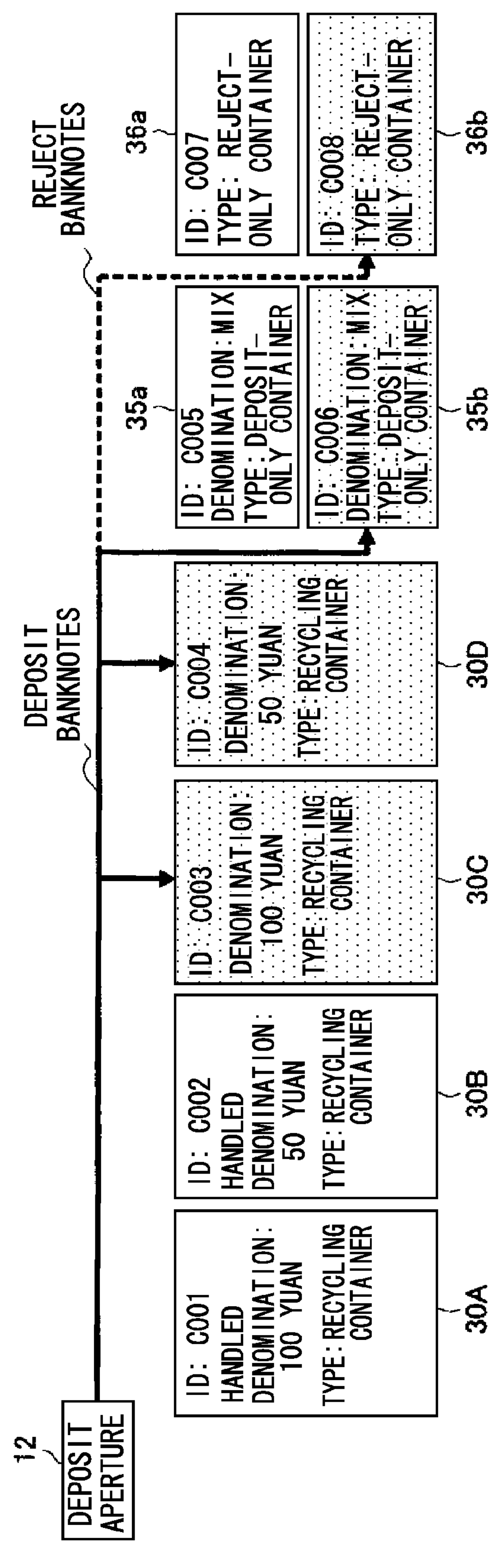
FIG. 19B is a schematic diagram for describing examples of the conveyance of banknotes during deposit processing according to the third exemplary embodiment.

FIG. 19A and FIG. 19B are schematic diagrams for describing the examples of conveyance of banknotes during deposit processing in accordance with the third exemplary embodiment. FIG. 19A illustrates an example of the conveyance of banknotes during a deposit process by staff member S1, and FIG. 19B illustrates an example of the conveyance of banknotes during a deposit process by staff member S2.

During a deposit process by staff member S1, as shown in FIG. 19A, when a deposit target banknote is a 100 Yuan banknote, the banknote is conveyed to the banknote cassette 30A, and when the deposit target banknote is a 50 Yuan banknote, the banknote is conveyed to the banknote cassette 30B. When the deposit target banknote is a note other than 50 Yuan or 100 Yuan and when the banknote cannot be stored in the banknote cassette 30A or 30B, the banknote is conveyed to the banknote storage container 35*a*. If the deposit target banknote is a reject banknote, the banknote is conveyed to the reject container 36*a*.

Similarly, during a deposit process by staff member S2, as shown in FIG. 19B, when a deposit target banknote is a 100 Yuan banknote, the banknote is conveyed to the banknote cassette 30C, and when the deposit target banknote is a 50 Yuan banknote, the banknote is conveyed to the banknote cassette 30D. When the deposit target banknote is a note other than 50 Yuan or 100 Yuan and when the banknote cannot be stored in the banknote cassette 30C or 30D, the banknote is conveyed to the banknote storage container 35*a*. If the deposit target banknote is a reject banknote, the banknote is conveyed to the reject container 36*b*.

Figure 20A:
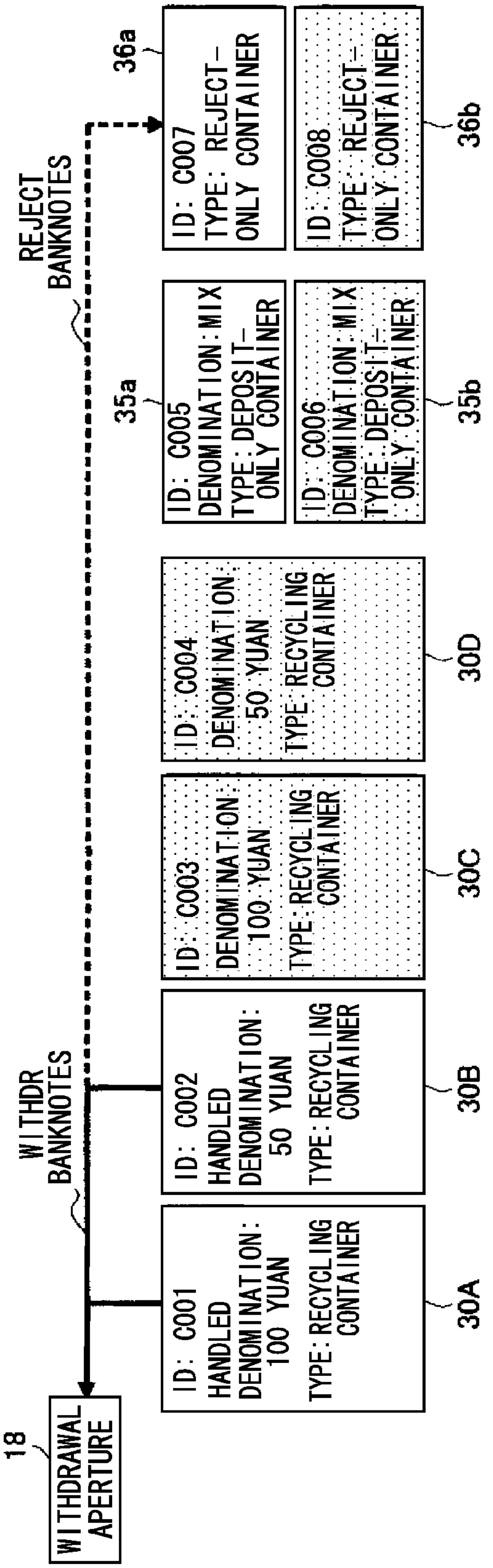
FIG. 20A is a schematic diagram for describing examples of the conveyance of banknotes during withdrawal processing according to the third exemplary embodiment.
Figure 20B:
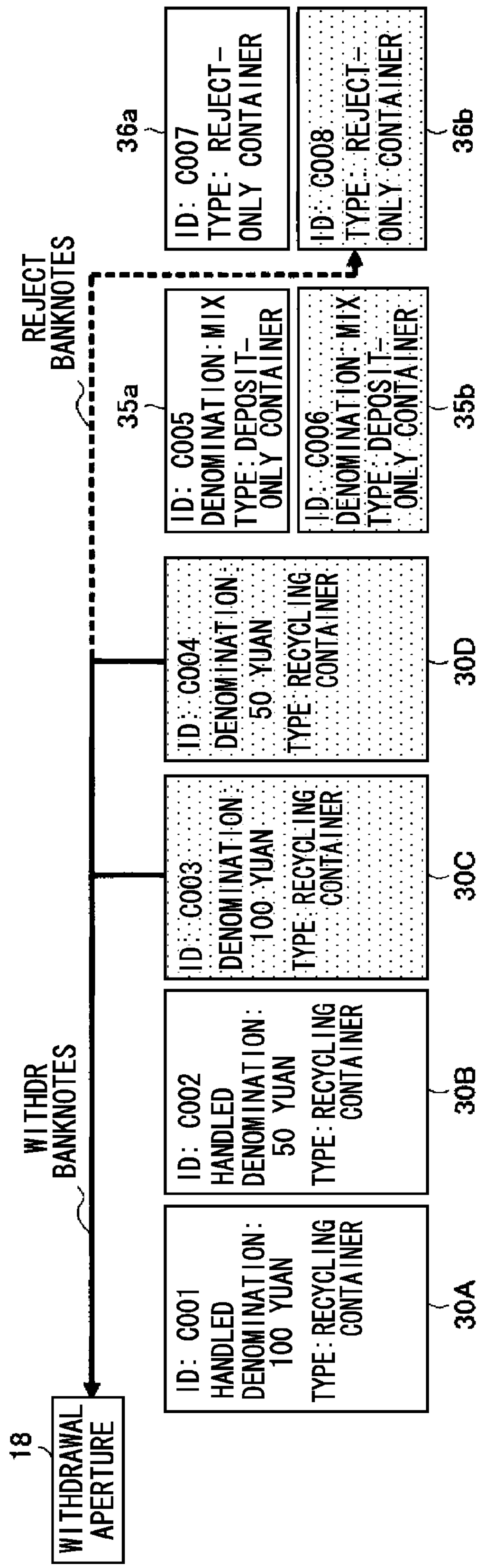
FIG. 20B is a schematic diagram for describing examples of the conveyance of banknotes during withdrawal processing according to the third exemplary embodiment.

FIG. 20A and FIG. 20B are schematic diagrams for describing examples of conveyance of banknotes during withdrawal processing in accordance with the third exemplary embodiment. FIG. 20A illustrates an example of the conveyance of banknotes during a withdrawal process by staff member S1, and FIG. 20B illustrates an example of the conveyance of banknotes during a withdrawal process by staff member S2.

During a withdrawal process by staff member S1, as shown in FIG. 20A, when a withdrawal target banknote is a 100 Yuan banknote, a banknote is fed out from the banknote cassette 30A, and when the withdrawal target banknote is a 50 Yuan banknote, the banknote is fed out from the banknote cassette 30B. If the fed banknote is not a reject banknote, the banknote is conveyed to the withdrawal aperture 18, and if the fed banknote is a reject banknote, the banknote is conveyed to the reject container 36*a*.

Similarly, during a withdrawal process by staff member S2, when a withdrawal target banknote is a 100 Yuan banknote, a banknote is fed out from the banknote cassette 30C, and when the withdrawal target banknote is a 50 Yuan banknote, the banknote is fed out from the banknote cassette 30D. If the banknote is not a reject banknote, the banknote is conveyed to the withdrawal aperture 18, and if the banknote is a reject banknote, the banknote is conveyed to the reject container 36*b*.

According to the third exemplary embodiment described hereabove, the plural banknote cassettes are configured only as dedicated cassettes. Thus, it may be even more easily identified which of the banknotes in the cassettes each of staff member S1 and staff member S2 is responsible for handling.

4. Fourth Exemplary Embodiment

The structure of the banknote processing device 10 according to a fourth exemplary embodiment is similar to the first exemplary embodiment. That is, in the fourth exemplary embodiment, as shown in FIG. 3, the banknote cassettes 30A and 30B are applied as dedicated cassettes for staff member S1, the banknote cassettes 30C and 30D are applied as dedicated cassettes for staff member S2, and the banknote storage container 35*a* and reject container 35*b* of the banknote cassette 35 are applied as common cassettes for staff members S1 and S2.

In the fourth exemplary embodiment, during a process of recovery at the withdrawal aperture 18 of banknotes from the banknote storage container 35*a* that is a common cassette, the control section 70 conveys to the withdrawal aperture 18, of banknotes stored in the banknote storage container 35*a*, only banknotes that have been processed in accordance with commands from either staff member S1 or staff member S2. Thus, only banknotes that staff member S1 (or staff member S2) is responsible for handling may be stacked in the withdrawal aperture 18 during the recovery process, and a staff member may easily recover from the banknote storage container 35*a* only the banknotes that that staff member is responsible for handling.

Figure 21:
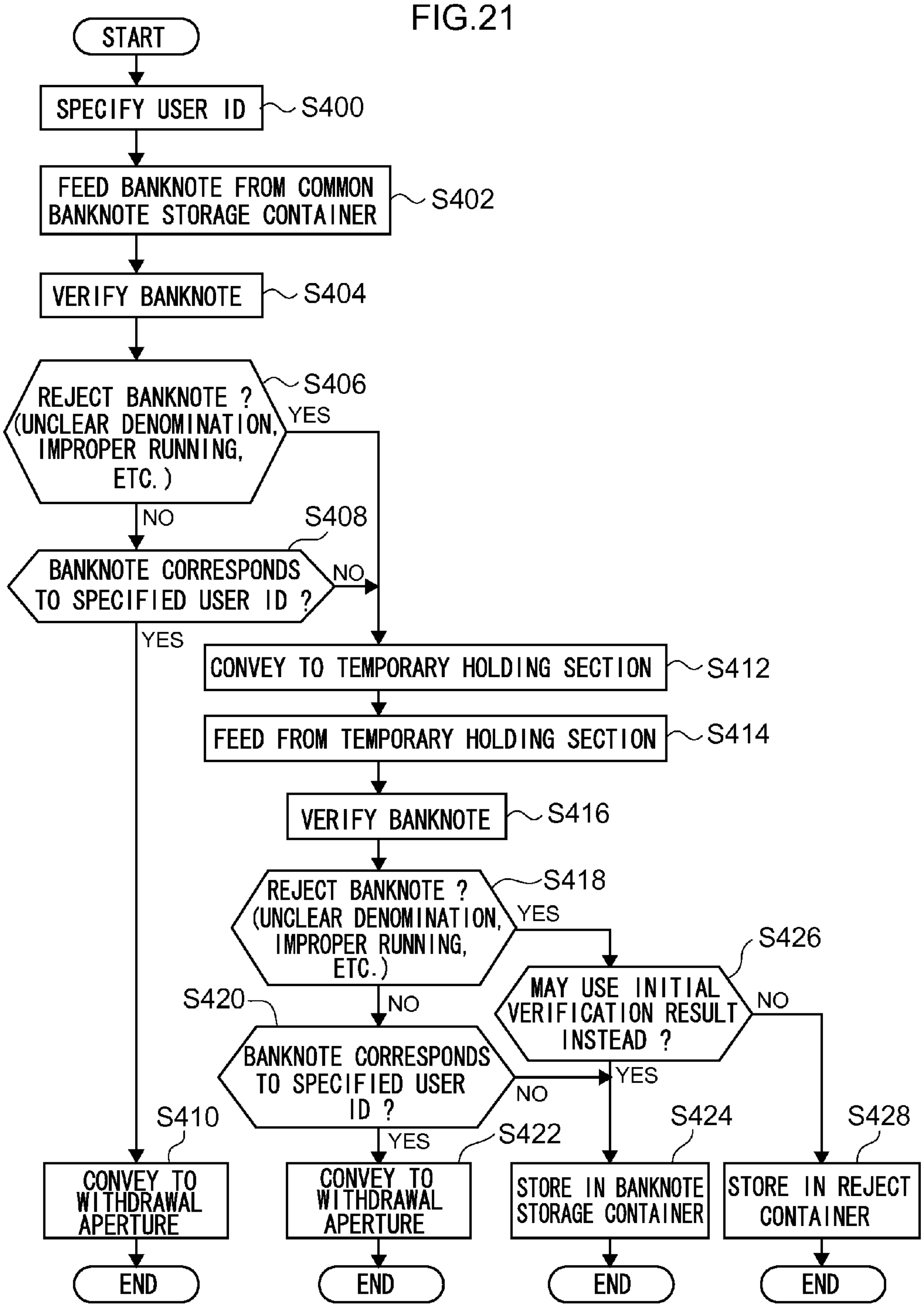
FIG. 21 is a flowchart showing an example of recovery processing according to a fourth exemplary embodiment.

Below, an example of a recovery process that recovers the banknotes that a respective staff member is responsible for handling from the banknote storage container 35*a* to the withdrawal aperture 18 is described while referring to FIG. 21. FIG. 21 is a flowchart showing an example of recovery processing in accordance with the fourth exemplary embodiment.

The flowchart in FIG. 21 is commenced after staff member S1 (or S2) has specified their own user ID (step S400). The control section 70 feeds out a banknote from the banknote storage container 35*a* that is a common cassette (step S402) and verifies the banknote at the banknote verification section 20 (step S404).

Then, in accordance with a verification result at the banknote verification section 20, the control section 70 makes a determination (step S406) as to whether the banknote is a reject banknote (a banknote whose denomination is unclear, a banknote that is running improperly, or the like). If the result of the determination in step S406 is that the banknote is not a reject banknote ("No"), the control section 70 makes a determination as to whether the verified banknote is a banknote corresponding with the user ID specified in step S400 (step S408). For example, the control section 70 makes the determination by referring to table T2 of FIG. 7.

If the result of the determination in step S408 is that the banknote corresponds with the user ID ("Yes"), the control section 70 conveys the banknote to the withdrawal aperture 18 (step S410). Thus, only banknotes that, for example, staff member S1 (or S2) is responsible for handling are conveyed to the withdrawal aperture 18.

If the result of the determination in step S406 is that the banknote is a reject banknote ("Yes"), or if the result of the determination in step S408 is that the banknote does not correspond with the user ID ("No"), the control section 70 conveys the banknote to the temporary holding section 22 (step S412). Subsequently, the control section 70 feeds out the banknote from the temporary holding section 22 (step S414) and verifies the banknote at the banknote verification section 20 again (step S416).

Then, in accordance with a verification result at the banknote verification section 20, the control section 70 makes a determination as to whether the banknote is a reject banknote (step S418). If the result of the determination in step S418 is that the banknote is not a reject banknote ("No"), the control section 70 makes a determination as to whether the verified banknote is a banknote corresponding with the user ID specified in step S400 (step S420).

If the result of the determination in step S420 is that the banknote corresponds with the user ID ("Yes"), the control section 70 conveys the banknote to the withdrawal aperture 18 (step S422). On the other hand, if the result of the determination in step S420 is that the banknote does not correspond with the user ID ("No"), the control section 70 conveys the banknote to the banknote storage container 35*a* and stores the banknote therein (step S424).

If the result of the determination in step S418 is that the banknote is a reject banknote ("Yes"), the control section 70 makes a determination as to whether the initial verification result from step S404 may be used instead (step S426). For example, if it is determined from the initial verification result (step S404) that a banknote is not a reject banknote and that the banknote does not correspond with the specified user ID, and thereafter it is determined from the second verification result (step S416) that the banknote is a reject banknote, then the initial verification result may be used instead.

If the result of the determination in step S426 is that the initial verification result may be used ("Yes"), the control section 70 conveys the banknote to the banknote storage container 35*a* and stores the banknote therein (step S424). On the other hand, if the result of the determination in step S426 is that the initial verification result may not be used ("No"), the control section 70 conveys the banknote to the reject container 35*b* and stores the banknote therein (step S428).

According to the fourth exemplary embodiment described hereabove, during recovery processing, of banknotes stored in the banknote storage container 35*a* that is a common cassette, just the banknotes that staff member S1 (or staff member S2) is responsible for handling may be stacked at the withdrawal aperture 18. Consequently, a staff member may easily recover from the banknote storage container 35*a* only the banknotes that that staff member is responsible for handling.

5. Conclusion

As illustrated in FIG. 1, the banknote processing device 10 described above is equipped with the plural banknote cassettes 30A to 30D and 35 that store banknotes. The plural banknote cassettes include a first dedicated storage section (for example, the banknote cassettes 30A and 30B shown in FIG. 3) that stores only banknotes processed in accordance with commands from, of a plural number of staff members (the staff members S1 and S2 illustrated in FIG. 2), a first user (for example, staff member S1) and a second dedicated storage section (for example, the banknote cassettes 30C and 30D shown in FIG. 3) that stores only banknotes processed in accordance with commands from a second user (for example, staff member S2).

Thus, banknotes that are being deposited and withdrawn in accordance with commands from the first user are stored in the first dedicated storage section, and banknotes that are being deposited and withdrawn in accordance with commands from the second user are stored in the second dedicated storage section. Therefore, the banknotes may be prevented from mixing together. Therefore, even when banknotes are being processed in accordance with commands from plural users, the banknotes that each user is responsible for handling may be easily identified.

Preferable exemplary embodiments of the present invention have been described in detail while referring to the attached drawings, but the present invention is not limited by these examples. It will be clear to the practitioner having ordinary skill in the field of art to which the present invention belongs that numerous modifications and improvements are possible within the scope of the technical gist recited in the attached claims, and it should be understood that these modifications and improvements are to be encompassed by the technical scope of the invention.

Moreover, the above-described steps in processing by the banknote processing device 10 need not necessarily be processed in chronological order in accordance with the sequences recited in the flowcharts. For example, the steps in processing by the banknote processing device 10 may be processed in a different sequence from the sequences recited in the flowcharts, and may be processed in parallel.

A computer program may be prepared that causes hardware such as a CPU, ROM, RAM and the like incorporated in the banknote processing device 10 to realize functions equivalent to the respective functions of the banknote processing device 10 described above.

The exemplary embodiments described above describe application of the banknote processing device 10 to staff-operated terminals, but applications are not limited thus. For example, the present invention may be applied to a cash processing section of a customer-operated terminal, which is an ATM (automated teller machine) as typified by ATMs of the type in which banknotes are circulated (recycled). These ATMs are installed in numerous locations such as banks, train stations, convenience stores and so forth. A customer may conduct transactions such as deposits, withdrawals and balance enquiries by performing various operations on display screens displayed at the ATM.

The disclosures of Japanese Patent Application No. 2012-193392 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A banknote processing device, connected to a plurality of operation devices respectively operated by a plurality of users, which processes banknotes in accordance with commands from the users via the operation devices, the banknote processing device comprising:

a conveyance section that conveys the banknotes; and a plurality of banknote storage sections that store the banknotes conveyed by the conveyance section, wherein the plurality of banknote storage sections includes:

a first dedicated storage section that stores only banknotes processed in accordance with commands from a first user among the plurality of users, and a second dedicated storage section that stores only banknotes processed in accordance with commands from a second user among the plurality of users.

2. The banknote processing device according to claim 1, wherein the plurality of banknote storage sections further comprises a common storage section that stores banknotes processed in accordance with commands from the first user and banknotes used in accordance with commands from the second user.

3. The banknote processing device according to claim 1, wherein the first dedicated storage section and the second dedicated storage section store banknotes of the same denomination.

4. The banknote processing device according to claim 1, wherein the plurality of banknote storage sections includes the first dedicated storage section and the second dedicated storage section storing banknotes of different denominations.

5. The banknote processing device according to claim 2, wherein:

the first dedicated storage section and the second dedicated storage section stack the banknotes during banknote deposit processing and feed out the banknotes during banknote withdrawal processing, and the common storage section includes a storage section that stacks banknotes during the deposit processing but does not feed out banknotes during the withdrawal processing.

6. The banknote processing device according to claim 1, wherein each of the first dedicated storage section and the second dedicated storage section includes a deposit-only storage section that stacks banknotes during banknote deposit processing but does not feed out banknotes during banknote withdrawal processing.

7. The banknote processing device according to claim 6, wherein:

the plurality of banknote storage sections includes a common storage section that stores banknotes processed in accordance with commands from the first user and banknotes used in accordance with commands from the second user, and the common storage section includes a feed-only storage section that does not stack banknotes during the deposit processing but does feed out banknotes during the withdrawal processing.

8. The banknote processing device according to claim 1, wherein the plurality of banknote storage sections consists only of plural first dedicated storage sections and second dedicated storage sections.

9. The banknote processing device according to claim 2, further comprising:

a withdrawal aperture at which the banknotes are fed out; and a control section that controls conveyance of the banknotes, wherein, during a recovery process of banknotes from the common storage section to the withdrawal aperture, the control section conveys to the withdrawal aperture, of the banknotes stored in the common storage section, only banknotes processed in accordance with commands from one of the first user or the second user.

10. The banknote processing device according to claim 2, further comprising a memory section that memorizes information representing whether a banknote stored in the common storage section has been processed in accordance with a command from the first user or the second user.

* * * * *